US012143601B2

(12) United States Patent
Hsu et al.

(10) Patent No.: US 12,143,601 B2
(45) Date of Patent: Nov. 12, 2024

(54) SPECIFYING LAYOUT IN VIDEO PICTURES

(71) Applicant: MediaTek Inc., Hsinchu (TW)

(72) Inventors: Chih-Wei Hsu, Hsinchu (TW); Lulin Chen, San Jose, CA (US); Yu-Ling Hsiao, Hsinchu (TW); Chun-Chia Chen, Hsinchu (TW); Ching-Yeh Chen, Hsinchu (TW); Chen-Yen Lai, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/110,208

(22) Filed: Dec. 2, 2020

(65) Prior Publication Data

US 2021/0176475 A1 Jun. 10, 2021

Related U.S. Application Data

(60) Provisional application No. 62/960,095, filed on Jan. 12, 2020, provisional application No. 62/958,607, (Continued)

(51) Int. Cl.
*H04N 19/167* (2014.01)
*H04N 19/169* (2014.01)
(Continued)

(52) U.S. Cl.
CPC ......... *H04N 19/167* (2014.11); *H04N 19/176* (2014.11); *H04N 19/1883* (2014.11); *H04N 19/46* (2014.11); *H04N 19/70* (2014.11)

(58) Field of Classification Search
CPC .... H04N 19/167; H04N 19/46; H04N 19/176; H04N 19/1883; H04N 19/70; H04N 19/174; H04N 19/119
See application file for complete search history.

(56) References Cited

U.S. PATENT DOCUMENTS

| 6,094,234 A * | 7/2000 | Nonomura ............. | H04N 19/00 348/700 |
| 2007/0189377 A1* | 8/2007 | Taylor ................... | H04N 19/61 375/E7.199 |

(Continued)

FOREIGN PATENT DOCUMENTS

| WO | WO 2018/177819 A1 | 10/1918 | |
| WO | WO-2019045445 A1 * | 3/2019 | ........... H04N 19/119 |

(Continued)

OTHER PUBLICATIONS

Taiwanese Office Action dated Apr. 11, 2022 in Taiwanese Application No. 109142837 citing documents AO therein, 17 pgs.

(Continued)

*Primary Examiner* — Richard A Hansell, Jr.
(74) *Attorney, Agent, or Firm* — McClure, Qualey & Rodack, LLP

(57) ABSTRACT

A method for specifying layout of subpictures in video pictures is provided. A video decoder receives data from a bitstream to be decoded as a current picture of a video. For a current subpicture of a set of subpictures of the current picture, the video decoder determines a position of the current subpicture based on a width and a height of the current picture and a previously determined width and height of a particular subpicture in the set of subpictures. The video decoder reconstructs the current picture and the current subpicture based on the determined position.

11 Claims, 9 Drawing Sheets

Related U.S. Application Data filed on Jan. 8, 2020, provisional application No. 62/956,676, filed on Jan. 3, 2020, provisional application No. 62/955,381, filed on Dec. 30, 2019, provisional application No. 62/943,835, filed on Dec. 5, 2019.

(51) Int. Cl.
*H04N 19/176* (2014.01)
*H04N 19/46* (2014.01)
*H04N 19/70* (2014.01)

(56) References Cited

U.S. PATENT DOCUMENTS

| | | | | |
|---|---|---|---|---|
| 2012/0163453 A1* | 6/2012 | Horowitz | ............ | H04N 19/174 |
| | | | | 375/E7.243 |
| 2013/0208793 A1* | 8/2013 | Kazui | ................. | H04N 19/152 |
| | | | | 375/240.12 |
| 2014/0119445 A1* | 5/2014 | Tan | ........................ | H04N 19/89 |
| | | | | 375/E7.23 |
| 2015/0195577 A1* | 7/2015 | Hannuksela | ........... | H04N 19/70 |
| | | | | 375/240.25 |
| 2015/0249840 A1* | 9/2015 | Kim | ..................... | H04N 19/149 |
| | | | | 375/240.18 |
| 2021/0084222 A1* | 3/2021 | Kim | ..................... | H04N 19/597 |
| 2021/0144384 A1* | 5/2021 | Sjöberg | ................. | H04N 19/70 |
| 2021/0160493 A1* | 5/2021 | Han | ..................... | H04N 19/129 |
| 2021/0203959 A1* | 7/2021 | Chen | .................... | H04N 19/117 |
| 2021/0337228 A1* | 10/2021 | Wang | .................. | H04N 19/119 |
| 2022/0217415 A1* | 7/2022 | Hendry | ................ | H04N 19/172 |

FOREIGN PATENT DOCUMENTS

| | | | | |
|---|---|---|---|---|
| WO | WO-2020185883 A1 * | 9/2020 | ............ | G06V 10/62 |
| WO | WO-2021033749 A1 * | 2/2021 | ........... | H04N 19/174 |

OTHER PUBLICATIONS

Jonathan Samuelsson, et al. AHG8/AHG17: On Access Unit Delimiter and Picture Detection, Joint Video Experts Team (JVET) of ITU-T SG 16 WP 3 and ISO/IEC JTC 1/SC 29/WG 11 16th Meeting: Geneva, CH, Oct. 1-11, 2019, Document: JVET-P0218-v1, 5 pgs.

\* cited by examiner

SPECIFYING LAYOUT IN VIDEO PICTURES

CROSS REFERENCE TO RELATED PATENT APPLICATION(S)

The present disclosure is part of a non-provisional application that claims the priority benefit of U.S. Provisional Patent Application No. 62/943,835 filed on 5 Dec. 2019, No. 62/955,381 filed on 30 Dec. 2019, No. 62/956,676 filed on 3 Jan. 2020, No. 62/958,607 filed on 8 Jan. 2020, and No. 62/960,095 filed on 12 Jan. 2020. Contents of above-listed applications are herein incorporated by reference.

TECHNICAL FIELD

The present disclosure relates generally to video coding. In particular, the present disclosure relates to methods of specifying subpicture layout, slice structure, and picture identification.

BACKGROUND

Unless otherwise indicated herein, approaches described in this section are not prior art to the claims listed below and are not admitted as prior art by inclusion in this section.

High-efficiency video coding (HEVC) is the latest international video coding standard developed by the Joint Collaborative Team on Video Coding (JCT-VC). The input video signal is predicted from the reconstructed signal, which is derived from the coded picture regions. The prediction residual signal is processed by a linear transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In HEVC, a coded picture is partitioned into non-overlapped square block regions represented by the associated coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A CTU can be partitioned into multiple non-overlapped coding units (CUs) using the recursive quadtree (QT) structure to adapt to various local motion and texture characteristics. A CTU may also be partitioned into one or multiple smaller size CUs by a quadtree with nested multi-type tree using binary and ternary split. The resulting CU partitions can be in square or rectangular shapes.

One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for specifying layout of subpictures in video pictures. A video decoder receives data from a bitstream to be decoded as a current picture of a video. For a current subpicture of a set of subpictures of the current picture, the video decoder determines a position of the current subpicture based on a width of the current picture and a previously determined width of a particular subpicture in the set of subpictures. The video decoder reconstructs the current picture and the current subpicture based on the determined position.

The decoder determines a position of the current subpicture based on a size (width or height) of the current picture and a previously determined size (width or height) of a particular subpicture in the set of subpictures. The size of the current subpicture is inferred and not signaled in the bitstream. The decoder may determine the horizontal or x-position of the current subpicture based on the width of the current picture and a previously determined width of the particular subpicture.

The position of the current subpicture may be determined based on the width of the current subpicture, and the width of the current subpicture may be determined based on the width of the particular subpicture in the set of subpictures and a width of the current picture. In some embodiments, the width of the current subpicture may be determined by subtracting from the width of the current picture, widths of all subpictures in the set of subpictures except the current subpicture.

In some embodiments, the determined position of the subpicture is expressed as an index of a coded tree block (CTB) at a corner of the current subpicture, and the width of the particular picture is expressed in terms of a number of coded tree bocks (CTBs).

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

Figure 1:
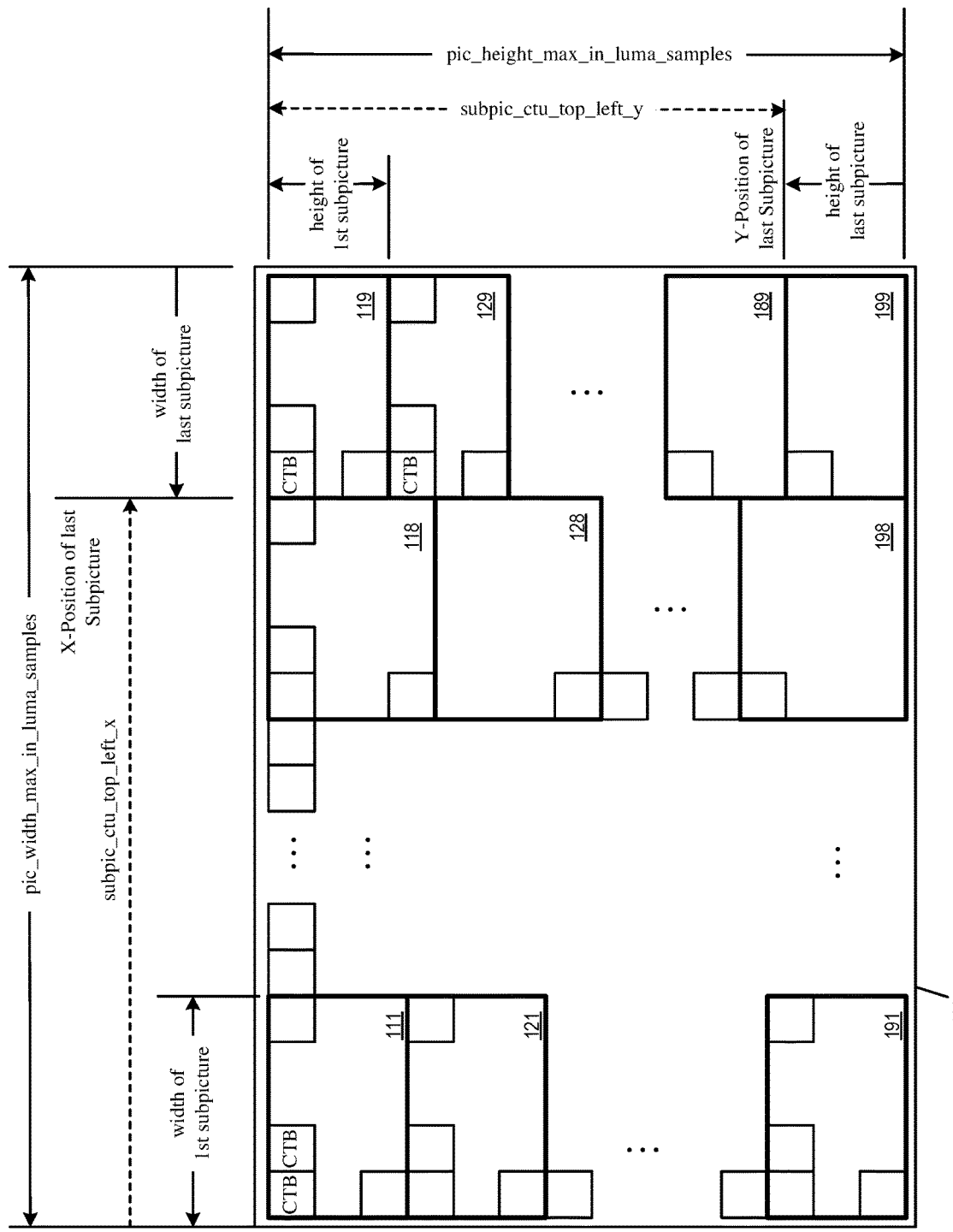
FIG. 1 conceptually illustrates determining the position of a subpicture of a current picture when there are multiple subpictures in the current picture.

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Signaling Picture Order Count in Picture Header

In coded video, the picture header (PH) of a picture may be used as the start of the picture. Unlike a picture parameter set (PPS) that store information common to several pictures that refers to the PPS, a picture header of a picture store information unique to the picture. The picture header of a picture may store parameters of the picture that remain the same for different slices of the picture. Table 1 shows a picture header.

TABLE 1

|  | Descriptor |
| --- | --- |
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_subpic_id_present_flag && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for( i = 0; i <= sps_num_subpics_minus1; i++ ) | |
|         ph_subpic_id[ i ] | u(v) |
|     } | |
|   } | |
|   if( !sps_loop_filter_across_virtual_boundaries_disabled_present_flag ) { | |
|     ph_loop_filter_across_virtual_boundaries_disabled_present_flag | u(1) |
|     if( ph_loop_filter_across_virtual_boundaries_disabled_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |
|   if( separate_colour_plane_flag = = 1 ) | |
|     colour_plane_id | u(2) |
|   if( output_flag_present_flag ) | |
|     pic_output_flag | u(1) |
|   pic_rpl_present_flag | u(1) |
|   if( pic_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i = = 0 | | ( i = = 1 && rpl1_idx_present_flag ) ) ) | |
|         pic_rpl_sps_flag[ i ] | u(1) |
|       if( pic_rpl_sps_flag[ i ] ) { | |
|         if( num_ref_pic_lists_in_sps[ i ] > 1 && | |
|           ( i = = 0 | | ( i = = 1 && rpl1_idx_present_flag ) ) ) | |

TABLE 1-continued

|  | Descriptor |
|---|---|
|                             pic_rpl_idx[ i ] | u(v) |
|         } else |  |
|                 ref_pic_list_struct( i, num_ref_pic_lists_in_sps[ i ] ) |  |
|         for( j = 0; j < NumLtrpEntries[ i ][ RplsIdx[ i ] ]; j++ ) { |  |
|             if( ltrp_in_slice_header_flag[ i ][ RplsIdx[ i ] ] ) |  |
|                 pic_poc_lsb_lt[ i ][ j ] | u(v) |
|             pic_delta_poc_msb_present_flag[ i ][ j ] | u(1) |
|             if( pic_delta_poc_msb_present_flag[ i ][ j ] ) |  |
|                 pic_delta_poc_msb_cycle_lt[ i ][ j ] | ue(v) |
|         } |  |
|     } |  |
| } |  |
| if( partition_constraints_override_enabled_flag ) { |  |
|     partition_constraints_override_flag | u(1) |
|     if( partition_constraints_override_flag ) { |  |
|         pic_log2_diff_min_qt_min_cb_intra_slice_luma | ue(v) |
|         pic_log2_diff_min_qt_min_cb_inter_slice | ue(v) |
|         pic_max_mtt_hierarchy_depth_inter_slice | ue(v) |
|         pic_max_mtt_hierarchy_depth_intra_slice_luma | ue(v) |
|         if( pic_max_mtt_hierarchy_depth_intra_slice_luma != 0 ) { |  |
|             pic_log2_diff_max_bt_min_qt_intra_slice_luma | ue(v) |
|             pic_log2_diff_max_tt_min_qt_intra_slice_luma | ue(v) |
|         } |  |
|         if( pic_max_mtt_hierarchy_depth_inter_slice != 0 ) { |  |
|             pic_log2_diff_max_bt_min_qt_inter_slice | ue(v) |
|             pic_log2_diff_max_tt_min_qt_inter_slice | ue(v) |
|         } |  |
|         if( qtbtt_dual_tree_intra_flag ) { |  |
|             pic_log2_diff_min_qt_min_cb_intra_slice_chroma | ue(v) |
|             pic_max_mtt_hierarchy_depth_intra_slice_chroma | ue(v) |
|             if( pic_max_mtt_hierarchy_depth_intra_slice_chroma != 0 ) { |  |
|                 pic_log2_diff_max_bt_min_qt_intra_slice_chroma | ue(v) |
|                 pic_log2_diff_max_tt_min_qt_intra_slice_chroma | ue(v) |
|             } |  |
|         } |  |
|     } |  |
| } |  |
| if( cu_qp_delta_enabled_flag ) { |  |
|     pic_cu_qp_delta_subdiv_intra_slice | ue(v) |
|     pic_cu_qp_delta_subdiv_inter_slice | ue(v) |
| } |  |
| if( pps_cu_chroma_qp_offset_list_enabled_flag ) { |  |
|     pic_cu_chroma_qp_offset_subdiv_intra_slice | ue(v) |
|     pic_cu_chroma_qp_offset_subdiv_inter_slice | ue(v) |
| } |  |
| if( sps_temporal_mvp_enabled_flag ) |  |
|     pic_temporal_mvp_enabled_flag | u(1) |
| if(!pps_mvd_l1_zero_idc ) |  |
|     mvd_l1_zero_flag | u(1) |
| if( !pps_six_minus_max_num_merge_cand_plus1 ) |  |
|     pic_six_minus_max_num_merge_cand | ue(v) |
| if( sps_affine_enabled_flag ) |  |
|     pic_five_minus_max_num_subblock_merge_cand | ue(v) |
| if( sps_fpel_mmvd_enabled_flag ) |  |
|     pic_fpel_mmvd_enabled_flag | u(1) |
| if( sps_bdof_pic_present_flag ) |  |
|     pic_disable_bdof_flag | u(1) |
| if( sps_dmvr_pic_present_flag ) |  |
|     pic_disable_dmvr_flag | u(1) |
| if( sps_prof_pic_present_flag ) |  |
|     pic_disable_prof_flag | u(1) |
| if( sps_triangle_enabled_flag    &&    MaxNumMergeCand   >=   2   && |  |
|     !pps_max_num_merge_cand_mmus_max_num_triangle_cand_plus1 ) |  |
|     pic_max_num_merge_cand_minus_max_num_triangle_cand | ue(v) |
| if ( sps_ibc_enabled_flag ) |  |
|     pic_six_minus_max_num_ibc_merge_cand | ue(v) |
| if( sps_joint_cbcr_enabled_flag ) |  |
|     pic_joint_cbcr_sign_flag | u(1) |
| if( sps_sao_enabled_flag ) { |  |
|     pic_sao_enabled_present_flag | u(1) |
|     if( pic_sao_enabled_present_flag ) { |  |
|         pic_sao_luma_enabled_flag | u(1) |
|         if(ChromaArrayType != 0 ) |  |
|             pic_sao_chroma_enabled_flag | u(1) |
|     } |  |
| } |  |
| if( sps_alf_enabled_flag ) { |  |

TABLE 1-continued

| | Descriptor |
|---|---|
|     pic_alf_enabled_present_flag | u(1) |
|     if( pic_alf_enabled_present_flag ) { | |
|         pic_alf_enabled_flag | u(1) |
|         if( pic_alf_enabled_flag ) { | |
|             pic_num_alf_aps_ids_luma | u(3) |
|             for( i = 0; i < pic_num_alf_aps_ids_luma; i++ ) | |
|                 pic_alf_aps_id_luma[ i ] | u(3) |
|             if( ChromaArrayType != 0 ) | |
|                 pic_alf_chroma_idc | u(2) |
|             if( pic_alf_chroma_idc ) | |
|                 pic_alf_aps_id_chroma | u(3) |
|         } | |
|     } | |
| } | |
| if ( !pps_dep_quant_enabled_flag ) | |
|     pic_dep_quant_enabled_flag | u(1) |
| if( !pic_dep_quant_enabled_flag ) | |
|     sign_data_hiding_enabled_flag | u(1) |
| if( deblocking_filter_override_enabled_flag ) { | |
|     pic_deblocking_filter_override_present_flag | u(1) |
|     if( pic_deblocking_filter_override_present_flag ) { | |
|         pic_deblocking_filter_override_flag | u(1) |
|         if( pic_deblocking_filter_override_flag ) { | |
|             pic_deblocking_filter_disabled_flag | u(1) |
|             if( !pic_deblocking_filter_disabled_flag ) { | |
|                 pic_beta_offset_div2 | se(v) |
|                 pic_tc_offset_div2 | se(v) |
|             } | |
|         } | |
|     } | |
| } | |
| if( sps_lmcs_enabled_flag ) { | |
|     pic_lmcs_enabled_flag | u(1) |
|     if( pic_lmcs_enabled_flag ) { | |
|         pic_lmcs_aps_id | u(2) |
|         if( ChromaArrayType != 0 ) | |
|             pic_chroma_residual_scale_flag | u(1) |
|     } | |
| } | |
| if( sps_scaling_list_enabled_flag ) { | |
|     pic_scaling_list_present_flag | u(1) |
|     if( pic_scaling_list_present_flag ) | |
|         pic_scaling_list_aps_id | u(3) |
| } | |
| if( picture_header_extension_present_flag ) { | |
|     ph_extension_length | ue(v) |
|     for( i = 0; i < ph_extension_length; i++) | |
|         ph_extension_data_byte[ i ] | u(8) |
| } | |
| rbsp_trailing_bits( ) | |
| } | |

In some embodiments, the sequence parameter set (SPS) includes a syntax element sps_ph_repetition_enabled_flag that is a flag for enabling picture header repetition. Table 2 shows a SPS that includes a flag for enabling picture header repetition.

| | Descriptor |
|---|---|
| seq_parameter_set_rbsp( ) { | |
|     sps_decoding_parameter_set_id | u(4) |
|     sps_video_parameter_set_id | u(4) |
|     sps_max_sublayers_minus1 | u(3) |
|     sps_reserved_zero_4bits | u(4) |
|     sps_ptl_dpb_hrd_params_present_flag | u(1) |
|     if( sps_ptl_dpb_hrd_params_present_flag ) | |
|         profile_tier_level( 1, | |
|         sps_max_sublayers_minus1 ) | |
|     sps_ph_repetition_enabled_flag | u(1) |
|     gdr_enabled_flag | u(1) |
|     sps_seq_parameter_set_id | u(4) |
|     chroma_format_idc | u(2) |

-continued

| | Descriptor |
|---|---|
|     ... | |
|     sps_extension_flag | u(1) |
|     if( sps_extension_flag ) | |
|         while( more_rbsp_data( ) ) | |
|             sps_extension_data_flag | u(1) |
|     rbsp_trailing_bits( ) | |
| } | |

In some embodiments, a flag for enabling picture header repetition is present as a syntax element in general constraint info (GCI) in the bitstream. Table 3 shows a GCI that includes a flag no_ph_repetition_constraint_flag for allowing picture header repetition.

TABLE 3

| | Descriptor |
|---|---|
| general_constraint_info( ) { | |
|     general_progressive_source_flag | u(1) |
|     general_interlaced_source_flag | u(1) |
|     general_non_packed_constraint_flag | u(1) |
|     ... | |
|     no_radl_constraint_flag | u(1) |
|     no_idr_constraint_flag | u(1) |
|     no_cra_constraint_flag | u(1) |
| no_ph_repetition_constraint_flag | u(1) |
|     no_gdr_constraint_flag | u(1) |
|     no_aps_constraint_flag | u(1) |
|     while( !byte_aligned( ) ) | |
|         gci_alignment_zero_bit | f(1) |
|     num_reserved_constraint_bytes | u(8) |
|     for( i = 0; i < num_reserved_constraint_bytes; i++ ) | |
|         gci_reserved_constraint_byte[ i ] | u(8) |
| } | |

The value of syntax element no_ph_repetition_constraint_flag being equal to 1 indicates that there is no picture header repetitions present in OlsInScope and the value of sps_ph_repetition_enabled_flag is constrained to be 0. The value of no_ph_repetition_constraint_flag being equal to 0 does not impose such a constraint.

The value of the syntax element sps_ph_repetition_enabled_flag being equal to 1 specifies that picture header repetitions may be present in CLVSs for pictures associated to the PHs and referring to the SPS. The value of sps_ph_repetition_enabled_flag being equal to 0 specifies that picture header repetitions are not present in CLVSs for pictures referring to the SPS. The sps_ph_repetition_enabled_flag flag may be used as a general picture header repetition feature enabler for pictures in CLVSs, or furthery as a gate signal to control the actual feature presence in CLVSs. Table 4 shows a picture header that use the SPS picture header repetition enable flag (sps_ph_repetition_enabled_flag).

TABLE 4

| | Descriptor |
|---|---|
| picture_header_rbsp( ) { | |
|     if( sps_ph_repetition_enabled_flag ) | |
|         ph_pic_order_cnt_lsb | u(v) |
|     non_reference_picture_flag | u(1) |
|     gdr_pic_flag | u(1) |
|     no_output_of_prior_pics_flag | u(1) |
|     if( gdr_pic_flag ) | |
|         recovery_poc_cnt | ue(v) |
|     ph_pic_parameter_set_id | ue(v) |
|     ... | |
|     if( picture_header_extension_present_flag ) { | |
|         ph_extension_length | ue(v) |
|         for( i = 0; i < ph_extension_length; i++) | |
|             ph_extension_data_byte[ i ] | u(8) |
|     } | |
|     rbsp_trailing_bits( ) | |
| } | |

In some embodiments, the picture order count of the picture is specified in the picture header of the picture. Picture order count of a picture may be used to encode or decode the picture, e.g., for creating interpolated or extrapolated motion vectors for merge candidates for inter prediction. The picture order count may also be used as the identifier of the picture when the picture header is repeated as a loss detection mechanism.

The syntax element ph_pic_order_cnt_lsb specifies the picture order count modulo MaxPicOrderCntLsb for the current picture. The length of the syntax element ph_pic_order_cnt_lsb is log 2_max_pic_order_cnt_lsb_minus4+4 bits. The value of ph_pic_order_cnt_lsb is constrained to be in the range of 0 to MaxPicOrderCntLsb−1, inclusive. In some embodiments, the value of ph_pic_order_cnt_lsb is the same in all repetitive picture headers.

In some embodiments, each slice of a picture has a syntax element slice_pic_order_cnt_lsb for indicating the picture order count of the picture. The first slice with slice_pic_order_cnt_lsb having same value equal to ph_pic_order_cnt_lsb of the first picture header is the first slice of the picture associated with the picture header. In some embodiments, when present, the value of the slice header syntax element slice_pic_order_cnt_lsb is the same in all slice headers of a coded picture. Table 5 shows a slice header having the syntax element slice_pic_order_cnt_lsb.

| | Descriptor |
|---|---|
| slice_header( ) { | |
|     slice_pic_order_cnt_lsb | u(v) |
|     if( subpics_present_flag ) | |
|         slice_subpic_id | u(v) |
|     if( rect_slice_flag \|\| NumTilesInPic > 1 ) | |
|         slice_address | u(v) |
|     if( !rect_slice_flag && NumTilesInPic > 1 ) | |
|         num_tiles_in_slice_minus1 | ue(v) |
|     slice_type | ue(v) |
|     ... | |
|     byte_alignment( ) | |
| } | |

The variable CuQpDeltaVal, specifying the difference between a luma quantization parameter for the coding unit containing cu_qp_delta_abs and its prediction, is set equal to 0. The variables $CuQpOffset_b$, $CuQpOffset_{Cr}$, and $CuQpOffset_{CbCr}$, specifying values to be used when determining the respective values of the $Qp'_{Cb}$, $Qp'_{Cr}$, and $Qp'_{CbCr}$ quantization parameters for the coding unit containing cu_chroma_qp_offset_flag, are all set equal to 0.

In some embodiments, when ph_pic_order_cnt_lsb is not present, the syntax element slice_pic_order_cnt_lsb specifies the picture order count modulo MaxPicOrderCntLsb for the current picture. The length of the slice_pic_order_cnt_lsb syntax element is log 2_max_pic_order_cnt_lsb_minus4+4 bits. The value of the slice_pic_order_cnt_lsb shall be in the range of 0 to MaxPicOrderCntLsb−1, inclusive. When ph_pic_order_cnt_lsb is present, slice_pic_order_cnt_lsb shall be equal to ph_pic_order_cnt_lsb for the slices associated with the picture header.

In some embodiments, when the current picture is a gradual decoding refresh (GDR) picture, the variable RpPicOrderCntVal is derived according to RpPicOrderCntVal=PicOrderCntVal+recovery_poc_cnt.

In some embodiments, the SPS picture header repetition enable flag is used to determine whether to signal a picture header repetition enable flag at the picture level. Table 6 shows a picture header in which the SPS picture header repetition enable flag is used to determine whether to signal a picture header repetition enable flag.

TABLE 6

| | Descriptor |
|---|---|
| picture_header_rbsp( ) { | |
|     if( sps_ph_repetition_enabled_flag ) | |
|         ph_repetition_present_flag | u(1) |

TABLE 6-continued

| | Descriptor |
|---|---|
| if( ph_repetition_present_flag ) | |
|     ph_pic_order_cnt_lsb | u(v) |
| non_reference_picture_flag | u(1) |
| gdr_pic_flag | u(1) |
| no_output_of_prior_pics_flag | u(1) |
| if( gdr_pic_flag ) | |
|     recovery_poc_cnt | ue(v) |
| ph_pic_parameter_set_id | ue(v) |
| ... | |
| if( picture_header_extension_present_flag ) { | |
|     ph_extension_length | ue(v) |
|     for( i = 0; i < ph_extension_length; i++) | |
|         ph_extension_data_byte[ i ] | u(8) |
| } | |
| rbsp_trailing_bits( ) | |
| } | |

The syntax element ph_repetition_present_flag being equal to 1 specifies that ph_pic_order_cnt_lsb is present for the coded picture associated with the picture header. The picture header repetition may or may not occur for the coded picture associated with the picture header. The syntax element ph_repetition_flag being equal to 0 specifies that ph_pic_order_cnt_lsb is not present.

II. Signaling Subpicture and Slice Layout

A subpicture is a secondary or subsidiary picture or frame of a main video picture, or defined as a rectangular region in a picture. A subpicture may display images, video, texts, or other types of data that are separately coded from the video data of the main video picture. Multiple subpictures may be associated with a video picture, and the associated subpictures are positioned within the picture according to a layout. In some embodiments, rectangular slices may form subpictures that may be used to support sub-bitstream extraction, spatial random access, and bitstream editing etc. The subpicture layout may be specified in a sequence parameter set (SPS) of a sequence that includes the video picture. Table 7 below is an example syntax table for SPS that includes specification for subpicture layout.

TABLE 7

SPS with specification for subpicture layout

| | Descriptor |
|---|---|
| seq_parameter_set_rbsp( ) { | |
|     sps_decoding_parameter_set_id | u(4) |
|     sps_video_parameter_set_id | u(4) |
|     sps_max_sublayers_minus1 | u(3) |
|     sps_reserved_zero_4bits | u(4) |
|     sps_ptl_dpb_hrd_params_present_flag | u(1) |

TABLE 7-continued

SPS with specification for subpicture layout

| | Descriptor |
|---|---|
| if( sps_ptl_dpb_hrd_params_present_flag ) | |
|     profile_tier_level( 1, | |
|     sps_max_sublayers_minus1 ) | |
| gdr_enabled_flag | u(1) |
| sps_seq_parameter_set_id | u(4) |
| chroma_format_idc | u(2) |
| if( chroma_format_idc = = 3 ) | |
|     separate_colour_plane_flag | u(1) |
| ref_pic_resampling_enabled_flag | u(1) |
| pic_width_max_in_luma_samples | ue(v) |
| pic_height_max_in_luma_samples | ue(v) |
| sps_log2_ctu_size_minus5 | u(2) |
| subpics_present_flag | u(1) |
| if( subpics_present_flag ) { | |
|     sps_num_subpics_minus1 | u(8) |
|     for( i = 0; i <= sps_num_subpics_minus1; i++ ) { | |
|         subpic_ctu_top_left_x[ i ] | u(v) |
|         subpic_ctu_top_left_y[ i ] | u(v) |
|         subpic_width_minus1[ i ] | u(v) |
|         subpic_height_minus1[ i ] | u(v) |
|         subpic_treated_as_pic_flag[ i ] | u(1) |
|         loop_filter_across_subpic_enabled_flag[ i ] | u(1) |
|     } | |
| } | |
| sps_subpic_id_present_flag | u(1) |
| if( sps_subpics_id_present_flag ) { | |
|     sps_subpic_id_signalling_present_flag | u(1) |
|     if( sps_subpics_id_signalling_present_flag ) { | |
|         sps_subpic_id_len_minus1 | ue(v) |
|         for( i = 0; i <= sps_num_subpics_minus1; i++ ) | |
|             sps_subpic_id[ i ] | u(v) |
|     } | |
| } | |
| ... | |
| sps_extension_flag | u(1) |
| if( sps_extension_flag ) | |
|     while( more_rbsp_data( ) ) | |
|         sps_extension_data_flag | u(1) |
| rbsp_trailing_bits( ) | |
| } | |

In some embodiments, slice layout information of a video picture is signaled in a picture parameter set (PPS) of the video picture. A video picture in a slice-in-tile case is a video picture in which tiles are partitioned into slices. In some embodiments, for rectangular slices in the slice-in-tile picture, the layout of the slices is also specified in the PPS applicable to the picture. When the slice size is equal to the tile size, only the slice height in units of CTU is signaled since the width is the tile width. Table 8 below is an example syntax table for PPS that includes tile and slice syntax structure, for both uniform and non-uniform tile columns and rows for the slice layout specification.

TABLE 8

PPS that includes tile and slice syntax structure

| | Descriptor |
|---|---|
| pic_parameter_set_rbsp( ) { | |
|     pps_pic_parameter_set_id | ue(v) |
|     pps_seq_parameter_set_id | u(4) |
|     pic_width_in_luma_samples | ue(v) |
|     pic_height_in_luma_samples | ue(v) |
|     conformance_window_flag | u(1) |
|     ... | |
|     output_flag_present_flag | u(1) |
|     mixed_nalu_types_in_pic_flag | u(1) |
|     pps_subpic_id_signalling_present_flag | u(1) |

TABLE 8-continued

| PPS that includes tile and slice syntax structure | |
|---|---|
| | Descriptor |
| if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|         pps_subpic_id[ i ] | u(v) |
| } | |
| no_pic_partition_flag | u(1) |
| if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|         tile_column_width_minus1[ i ] | ue(v) |
|     for( i = 0; i <= num_exp_tile_rows_minus1; i++ ) | |
|         tile_row_height_minus1[ i ] | ue(v) |
|     rect_slice_flag | u(1) |
|     if( rect_slice_flag ) | |
|         single_slice_per_subpic_flag | u(1) |
|     if( rect_slice_flag && !single_slice_per_subpic_flag ) { | |
|         num_slices_in_pic_minus1 | ue(v) |
|         tile_idx_delta_present_flag | u(1) |
|         for( i = 0; i < num_slices_in_pic_minus1; i++ ) { | |
|             slice_width_in_tiles_minus1[ i ] | ue(v) |
|             slice_height_in_tiles_minus1[ i ] | ue(v) |
|             if( slice_width_in_tiles_minus1[ i ] == 0 && | |
|                 slice_height_in_tiles_minus1[ i ] == 0 ) { | |
|                 num_slices_in_tile_minus1[ i ] | ue(v) |
|                 numSlicesInTileMinus1 = num_slices_in_tile_minus1[ i ] | |
|                 for( j = 0; j < numSlicesInTileMinus1; j++ ) | |
|                     slice_height_in_ctu_minus1[ i++ ] | ue(v) |
|             } | |
|             if( tile_idx_delta_present_flag && i < num_slices_m_pic_minus1 ) | |
|                 tile_idx_delta[ i ] | se(v) |
|         } | |
|     } | |
|     loop_filter_across_tiles_enabled_flag | u(1) |
|     loop_filter_across_slices_enabled_flag | u(1) |
| } | |
| entropy_coding_sync_enabled_flag | u(1) |
| ... | |
| picture_header_extension_present_flag | u(1) |
| slice_header_extension_present_flag | u(1) |
| pps_extension_flag | u(1) |
| if( pps_extension_flag ) | |
|     while( more_rbsp_data( ) ) | |
|         pps_extension_data_flag | u(1) |
| rbsp_trailing_bits( ) | |
| } | |

Some embodiments of the disclosure provide a method to improve the signaling for the subpicture layout in the SPS at a video coder (encoder or decoder). In some embodiments, for signaling the subpicture layout in the SPS, the video coder may infer the size information when there is only one subpicture in the picture. When no subpicture is signaled or where there is only one subpicture within a picture, the picture is the subpicture with known position and size information. In some embodiments, the video coder may infer the top-left position for the first subpicture and infer the last subpicture position when there are more than one subpicture in the picture. The top-left position for the first subpicture is [0, 0] and the last subpicture is the right and bottom area of the picture. Table 9 shows modified SPS syntax for specifying subpicture layout.

TABLE 9

| Modified SPS syntax for specifying subpicture layout | |
|---|---|
| Subpics_present_flag | u(1) |
| if( subpics_present_flag ) { | |
|     sps_num_subpics_minus1 | u(8) |
| if( sps_num_subpics_minus1 ) { | |
|     for( i = 0; i <= sps_num_subpics_minus1; i++ ) { | |
|     if (i < sps_num_subpics_minus1) { | |
|     if( i > 0) { | |
|         subpic_ctu_top_left_x[ i ] | u(v) |
|         subpic_ctu_top_left_y[ i ] | u(v) |
|     } | |
|     subpic_width_minus1[ i ] | u(v) |
|     subpic_height_minus1[ i ] | u(v) |
| } | |
|     subpic_treated_as_pic_flag[ i ] | u(1) |
|     loop_filter_across_subpic_enabled_flag[ i ] | u(1) |

TABLE 9-continued

Modified SPS syntax for specifying subpicture layout

```
      }
   }
}
sps_subpic_id_present_flag                              u(1)
if( sps_subpics_id_present_flag ) {
   sps_subpic_id_signalling_present_flag                u(1)
   if( sps_subpics_id_signalling_present_flag ) {
      sps_subpic_id_len_minus1                          ue(v)
      for( i = 0; i <= sps_num_subpics_minus1; i++ )
         sps_subpic_id[ i ]                             u(v)
   }
}
...
```

In other words, when two or more subpictures are coded in the current picture, a size (e.g., width indicated by subpic_width_minus1 or height indicated by subpic_height_minus1) of the first subpicture (i=0) of the current picture are specified in the bitstream, but a position (e.g., top-left position indicated by subpic_ctu_top_left) of the first subpicture, a position and a size of the last subpicture (i=sps_num_subpics_minus1) are not specified in the bitstream. As for each subpicture other than the first and last subpicture (e.g., the second subpicture), both size and position of the subpicture are specified in the bitstream. In some embodiments, the position of the first subpicture, the position and the size of the last subpicture of the current picture are inferred by the video encoder or decoder and not signaled in the bitstream. When there is only one subpicture in the current picture, a position and a size of the only subpicture of the current picture are inferred by the video encoder or decoder and not signaled in the bitstream.

The syntax element subpic_ctu_top_left_x[i] specifies horizontal position of top left CTU of i-th subpicture in unit of CtbSizeY The length of the syntax element is Ceil(Log 2(pic_width_max_in_luma_samples÷CtbSizeY)) bits. When sps_num_subpics_minus1 is greater than 0 (i.e., there are multiple subpictures in the current picture), for i equal to sps_num_subpics_minus1, the value of subpic_width_minus1[i] is derived as follows:

```
- subpic_ctu_top_left_x[ i ] =
  Ceil( pic_width_max_in_luma_samples ÷ CtbSizeY ) -
  subpic_width_minus1[ i ] - 1.
- Otherwise when not present, the value of
  subpic_ctu_top_left_x[ i ] is inferred
  to be equal to 0.
```

The syntax element subpic_ctu_top_left_y[i] specifies vertical position of top left CTU of i-th subpicture in unit of CtbSizeY The length of the syntax element is Ceil(Log 2(pic_height_max_in_luma_samples÷CtbSizeY)) bits. When sps_num_subpics_minus1 is greater than 0, for i equal to sps_num_subpics_minus1, the value of subpic_height_minus1[i] is derived as follows.

```
- subpic_ctu_top_left_y[ i ] =
  Ceil( pic_height_max_in_luma_samples ÷ CtbSizeY ) -
  subpic_height_minus1[ i ] - 1.
- Otherwise when not present, the value of
  subpic_ctu_top_left_y[ i ] is inferred
  to be equal to 0.
```

The syntax element subpic_width_minus1[i] plus 1 specifies the width of the i-th subpicture in units of CtbSizeY The length of the syntax element is Ceil(Log 2(pic_width_max_in_luma_samples CtbSizeY)) bits. For i equal to sps_num_subpics_minus1, when sps_num_subpics_minus1 is greater than 0, the value of subpic_width_minus1[i], is derived as follows. Otherwise, the value of subpic_width_minus1[i], when not present, is inferred to be equal to Ceil(pic_width_max_in_luma_samples CtbSizeY)−1.

```
remainingWidthInCtbsY =
Ceil( pic_width_max_in_luma_samples ÷ CtbSizeY )
for( j = 0; j < sps_num_subpics_minus1; j++ )
   if( ( subpic_ctu_top_left_y[ j ] + subpic_height_minus1[ j ] +
     1 ) ==
PicHeightInCtbsY )
      remainingWidthInCtbsY -= subpic_width_minus1[ j ] + 1;
subpic_width_minus1[ i ] = remainingWidthInCtbsY - 1
```

The syntax element subpic_height_minus1[i] plus 1 specifies the height of the i-th subpicture in units of CtbSizeY The length of the syntax element is Ceil(Log 2(pic_height_max_in_luma_samples÷CtbSizeY)) bits. When sps_num_subpics_minus1 is greater than 0, for i equal to sps_num_subpics_minus1, the value of subpic_height_minus1[i] is derived as follows. Otherwise when not present, the value of subpic_height_minus1[i] is inferred to be equal to Ceil (pic_height_max_in_luma_samples÷CtbSizeY)−1.

```
remainingHeightInCtbsY =
Ceil( pic_height_max_in_luma_samples ÷ CtbSizeY )
for( j = 0; j < sps_num_subpics_minus1; j++ )
   if( ( subpic_ctu_top_left_x[ j ] + subpic_width_minus1[ j ] +
     1 ) ==
PicWidthInCtbsY )
      remainingHeightInCtbsY -= subpic_height_minus1[ j ] + 1;
subpic_height_minus1[ i ] = remainingHeightInCtbsY - 1
```

In some embodiments, the above two loop processing steps may be modified according to the following:

```
remainingWidthInCtbsY =
Ceil( pic_width_max_in_luma_samples ÷ CtbSizeY )
for( j = sps_num_subpics_minus1 - 1; j > 0; j-- ) {
   if( ( subpic_ctu_top_left_y[ j ] + subpic_height_minus1[ j ] +
     1 ) ==
PicHeightInCtbsY )
      remainingWidthInCtbsY -= subpic_width_minus1[ j ] + 1;
   if ( subpic_ctu_top_left_x[ j ] == 0)
      break;
}
subpic_width_minus1[ i ] = remainingWidthInCtbsY - 1
remainingHeightInCtbsY =
Ceil( pic_height_max_in_luma_samples ÷ CtbSizeY )
for( j = sps_num_subpics_minus1 - 1; j > 0; j-- ) {
   if( ( subpic_ctu_top_left_x[ j ] + subpic_width_minus1[ j ] +
     1 ) ==
PicWidthInCtbsY )
      remainingHeightInCtbsY -= subpic_height_minus1[ j ] + 1;
   if ( subpic_ctu_top_left_y[ j ] == 0)
      break;}
subpic_height_minus1[ i ] = remainingHeightInCtbsY - 1
```

For some embodiments, FIG. 1 conceptually illustrates determining the position of a subpicture of a current picture 100 when there are multiple subpictures in the current picture 100. As illustrated, the current picture 100 includes multiple subpictures 111-199 that are arranged in one or more rows and one or more columns. When encoding or decoding the current picture 100, the positions and the sizes (widths and heights) of the subpictures 111-199 are determined in sequence. The position and the size of the subpicture 111 is determined first, and the position and the size of the subpicture 199 is determined last.

The subpicture 111 corresponds to the first index (i=0) and the subpicture 199 correspond to the last index (i=sps_num_subpics_minus1). The position of subpicture 111 is not signaled in the bitstream but inferred based on the top-left corner of the current picture at (0, 0). The size and position of the subpicture 199 are not signaled in the bitstream but inferred by the encoder or decoder according to the following.

The x-position (horizontal position) of the subpicture 199 is determined based on the width of the current picture and previously determined width or widths of the other subpictures in the current picture. Specifically, the position of the subpicture 199 is determined based on a width of the subpicture 199. The width of the subpicture 199 is determined based on the width of the other subpictures (e.g., the first subpicture 191 in a same row direction as the last subpicture 199), and the width of the current picture 100 (pic_width_max_in_luma_samples). In some embodiments, the width of the subpicture 199 is determined by subtracting the widths of the subpictures 191-198 from the width of the current picture 100.

The y-position (vertical position) of the subpicture 199 is determined based on the height of the current picture and previously determined height or heights of the other subpictures in the current picture. Specifically, the position of the subpicture 199 is determined based on a height of the subpicture 119. The height of the subpicture 199 is determined based on the height of the other subpictures (e.g., the first subpicture 119 in a same column direction as the last subpicture 199), and the height of the current picture 100 (pic_height_max_in_luma_samples). In some embodiments, the height of the subpicture 199 is determined by subtracting the heights of the subpictures 119-198 from the height of the current picture 100.

In some embodiments, the determined position of a subpicture is expressed as an index of a coded tree block (CTB) at a corner (e.g., top-left corner) of that subpicture. The width and height of the current picture is expressed in terms of a number of coded tree bocks (CTBs).

III. Signaling Raster Scan Slice and Tile Layout

Slices may be tile-based or non-tile based. Non-tile slices are slices in a picture that is not partitioned into tiles such that the slices are not bound by tile boundaries. Tile slices are slices in a picture that is partitioned into tiles such that the slices are bound by tile boundaries. A raster scan slice is a slice defined by a sequence of CTUs in raster scan order, and therefore may not be rectangular.

For tile-based raster scan slices, tile partitioning is used as an intermediate data grouping layer for specifying slices. However, some coding tools may not be allowed across tile partition boundaries (e.g., spatial merge mode, affine merge mode, intra-prediction, etc.) such that the coding efficiency to some extent may be decreased. It may be advantageous for some applications to use a reasonable number of tile partitions or no tile partitions.

In some embodiments, tile partitioning for the raster scan slice is optional while the slice partition is specified in units of CTU. In some embodiments, a syntax element no_pic_partition_flag being equal to 1 specifies that no picture partitioning is applied to each picture referring to the PPS. This may imply that there is only a single tile or there is no tile partitioning in the picture. The tile partition parameters, though not present, may be inferred based on a set of inference rules. This is referred to as the slice-in-picture case. In some embodiments, in the slice-in-picture case, the slice is specified in units of CTUs based on raster scan.

Figure 2:
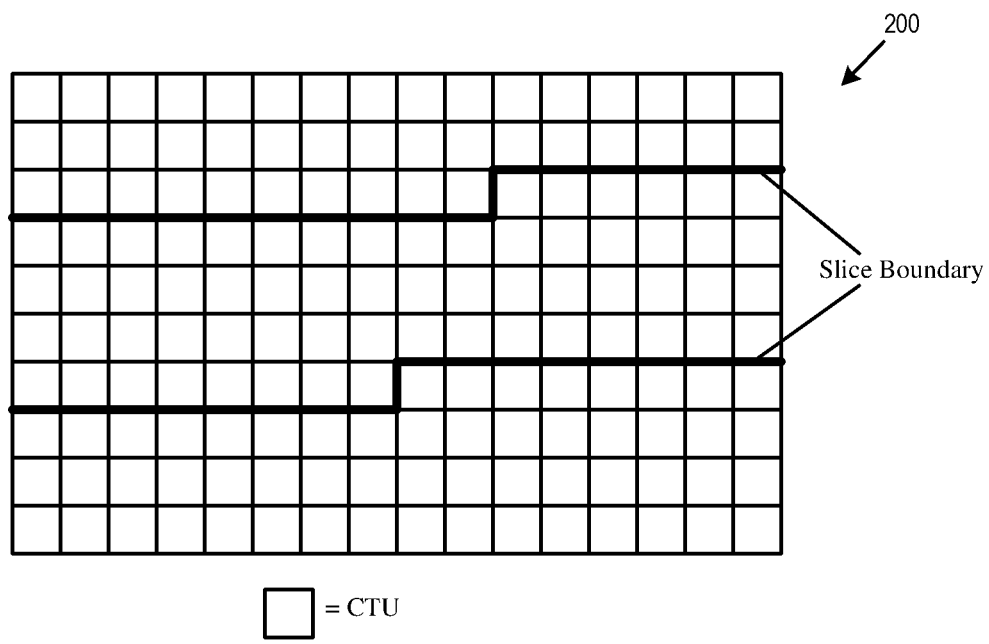
FIG. 2 illustrates slices in a video picture having only one tile or no tile partition, or the slice-in-picture case.

FIG. 2 illustrates slices in a video picture 200 having only one tile or no tile partition, or the slice-in-pictrue case. The video picture 200 can be regarded as having only one tile or no tile partitioning at all, and the slices within are non-tile based slices. As illustrated, the layout of the slices are limited by boundaries of the picture and not of any tiles, such that the slices are considered to be partitions of a picture rather than partitions of a tile. The slice in the video picture 200 are specified in units of CTUs in raster scan.

In some embodiments, when the current picture is partitioned into multiple non-tile based raster scan slices (or non-rectangular slices), whether multiple slices are coded in the current picture (slice-in-picture case) is specified in the bitstream. When the current picture is partitioned into multiple non-tile based raster scan slices and multiple slices are coded in the current picture, the size of a slice is specified in terms of CTUs. Specifically, the number of CTUs in a slice is specified in the bitstream. Tables 10A and 10B respectively show a PPS and a slice header for the slice-in-picture case.

TABLE 10A

PPS for slice-in-picture case

| | Descriptor |
|---|---|
| Pic_parameter_set_rbsp( ) { | |
|     pps_pic_parameter_set_id | ue(v) |
|     ... | |
|     output_flag_present_flag | u(1) |
|     mixed_nalu_types_in_pic_flag | u(1) |
|     pps_subpic_id_signalling_present_flag | u(1) |
|     if( pps_subpics_id_signalling_present_flag ) { | |
|         pps_num_subpics_minus1 | ue(v) |
|         pps_subpic_id_len_minus1 | ue(v) |
|         for( i = 0; i <= pps_num_subpic_minus1; i++ ) | |
|             pps_subpic_id[ i ] | u(v) |
|     } | |
|     no_pic_partition_flag | u(1) |
|     if( !no_pic_partition_flag ) { | |
|         pps_log2_ctu_size_minus5 | u(2) |
|         num_exp_tile_columns_minus1 | ue(v) |
|         num_exp_tile_rows_minus1 | ue(v) |
|         for( i = 0; i <= num_exp_tile_columns_minus1; i++ ) | |
|             tile_column_width_minus1[ i ] | ue(v) |

TABLE 10A-continued

PPS for slice-in-picture case

| | Descriptor |
|---|---|
|     for( i = 0; i <= num_exp_tile_rows_minus1; i++ ) | |
|         tile_row_height_minus1[ i ] | ue(v) |
|     rect_slice_flag | u(1) |
|     if( rect_slice_flag ) | |
|         single_slice_per_subpic_flag | u(1) |
|     if( rect_slice_flag && !single_slice_per_subpic_flag ) { | |
|         num_slices_in_pic_minus1 | ue(v) |
|         tile_idx_delta_present_flag | u(1) |
|         for( i = 0; i < num_slices_in_pic_minus1; i++ ) { | |
|             slice_width_in_tiles_minus1[ i ] | ue(v) |
|             slice_height_in_tiles_minus1[ i ] | ue(v) |
|             if( slice_width_in_tiles_minus1[ i ] == 0 && | |
|                 slice_height_in_tiles_minus1[ i ] == 0 ) { | |
|                 num_slices_in_tile_minus1[ i ] | ue(v) |
|                 numSlicesInTileMinus1 = num_slices_in_tile_minus1[ i ] | |
|                 for( j = 0; j < numSlicesInTileMinus1; j++ ) | |
|                     slice_height_in_ctu_minus1[ i++ ] | ue(v) |
|             } | |
|             if( tile_idx_delta_present_flag && i < num_slices_in_pic_minus1 ) | |
|                 tile_idx_delta[ i ] | se(v) |
|         } | |
|     } | |
|     loop_filter_across_tiles_enabled_flag | u(1) |
|     loop_filter_across_slices_enabled_flag | u(1) |
|   } | |
|  else | |
|     raster_scan_slice_in_pic_enabled_flag | u(1) |
|     if( raster_scan_slice_in_pic_enabled_flag ) | |
|         loop_filter_across_slices_enabled_flag | u(1) |
|     entropy_coding_sync_enabled_flag | u(1) |
|  ... | |
|     picture_header_extension_present_flag | u(1) |
|     slice_header_extension_present_flag | u(1) |
|     pps_extension_flag | u(1) |
|     if( pps_extension_flag ) | |
|         while( more_rbsp_data( ) ) | |
|             pps_extension_data_flag | u(1) |
|     rbsp_trailing_bits( ) | |
| } | |

TABLE 10B slice header for slice-in-picture case

| | Descriptor |
|---|---|
| slice_header( ) { | |
|     slice_pic_order_cnt_lsb | u(v) |
|     if( subpics_present_flag ) | |
|         slice_subpic_id | u(v) |
|  if( raster_scan_slice_in_pic_enabled_flag \|\| !rect_slice_flag && NumTilesInPic = 1) | |
|     slices_in_pic_present_flag | u(1) |
|  if( slices_in_pic_present_flag ) { | |
|     num_ctus_in_slice_minus1 | ue(v) |
|  } | |
|     else if( rect_slice_flag \|\| NumTilesInPic > 1 ) | |
|         slice_address | u(v) |
|     if( !rect_slice_flag && NumTilesInPic > 1 ) | |
|         num_tiles_in_slice_minus1 | ue(v) |
|     slice_type | ue(v) |
|  ... | |
|     if( slice_header_extension_present_flag ) { | |
|         slice_header_extension_length | ue(v) |
|         for( i = 0; i < slice_header_extension_length; i++) | |
|             slice_header_extension_data_byte[ i ] | u(8) |
|     } | |
|     byte_alignment( ) | |
| } | |

The value of the syntax element subpics_present_flag being 1 specifies that one or more subpictures are present in each coded picture in the coded layer-wise video sequence (CLVS) and subpicture parameters are present in in the SPS raw byte sequence payload (RBSP) syntax. The value of subpics_present_flag being equal to 0 specifies that no subpictures are present in each coded picture in the CLVS and subpicture parameters are not present in the SPS RBSP syntax. In some embodiments, when a bitstream is the result of a sub-bitstream extraction process and the bitstream contains only a subset of the subpictures of the input bitstream to the sub-bitstream extraction process, the value of subpics_present_flag is set to 1 in the RBSP of the SPSs. When subpics_present_flag is equal to 0, each coded picture in the CLVS may be considered as a subpicture in a bitstream extraction and merging process.

The value of the syntax element sps_num_subpics_minus1 plus 1 specifies the number of subpictures. The range of sps_num_subpics_minus1 is constrained to be 0 to 254 in some embodiments. When not present, the value of sps_num_subpics_minus1 is inferred to be equal to 0. The value of sps_num_subpics_minus1 being equal to 0 indicates that each coded picture in the CLVS is the subpicture.

The value of the syntax element rect_slice_flag equal to 0 specifies that tiles or CTUs within each slice are in raster scan order and the slice information is not signalled in PPS. The value of rect_slice_flag being equal to 1 specifies that tiles or CTUs within each slice cover a rectangular region of the picture and the slice information is signaled in the PPS. When not present, rect_slice_flag is inferred to be equal to 1. When subpics_present_flag is equal to 1, the value of rect_slice_flag is inferred to be equal to 1. When raster_scan_slice_in_pic_enabled_flag is equal to 1, the value of rect_slice_flag is inferred to be equal to 0.

The value of the syntax element no_pic_partition_flag being equal to 1 specifies that tile partitioning is not applied to pictures that refer to the PPS. The value of no_pic_partition_flag being equal to 0 specifies that each picture referring to the PPS may be partitioned into more than one tile or slice.

The value of the syntax element raster_scan_slice_in_pic_enabled_flag being equal to 0 specifies that no raster scan slice partitioning is applied to each picture referring to the PPS. The value of raster_scan_slice_in_pic_enabled_flag being equal to 1 specifies that, when no_pic_partition_flag is equal to 1, each picture referring to the PPS may be partitioned into more than one raster scan slice. When not present, the value of raster_scan_slice_in_pic_enabled_flag is inferred to be equal to 0.

The value of the syntax element single_slice_per_subpic_flag being equal to 1 specifies that each subpicture includes one and only one rectangular slice. The value of single_slice_per_subpic_flag being 0 specifies that each subpicture may consist one or more rectangular slices. When single_slice_per_subpic_flag is equal to 1, num_slices_in_pic_minus1 is inferred to be equal to sps_num_subpics_minus1. When single_slice_per_subpic_flag is equal to 1 and sps_num_subpics_minus1 is equal to 0, num_slices_in_pic_minus1 is inferred to be equal to 0 (i.e. the current picture is the subpicture and includes only one rectangular slice).

The value of the syntax element slices_in_pic_present_flag being equal to 1 specifies that multiple slices are present in the current picture. The value of slices_in_pic_present_flag equal to 0 specifies no multiple slices is present in the current picture. When not present, slices_in_pic_present_flag is inferred to be equal to 0.

The value of the syntax element num_ctus_in_slice_minus1 plus 1 specifies the number of CTUs in the current slice. When slices_in_pic_present_flag is equal to 1, the value of num_ctus_in_slice_minus1 in constrained to be in the range of 0 to PicSizeInCtbsY−1, inclusive. When not present, num_ctus_in_slice_minus1 is inferred to be equal to PicSizeInCtbsY−1.

The syntax element slice_address specifies the slice address of the slice. When not present, the value of slice_address is inferred to be 0.

If slices_in_pic_present_flag is equal to 1, the following applies:
  The slice address is the first CTB in the slice, in CTB raster scan of a picture.
  The length of slice_address is Ceil(Log 2 (PicSizeInCtbsY)) bits.
  The value of slice_address shall be in the range of 0 to PicSizeInCtbsY−1, inclusive, and the value of slice_address shall not be equal to the value of slice_address of any other coded slice NAL unit of the same coded picture.

Otherwise, if rect_slice_flag is equal to 0, the following applies:
  The slice address is the raster scan tile index.
  The length of slice_address is Ceil(Log 2 (NumTilesInPic)) bits.
  The value of slice_address shall be in the range of 0 to NumTilesInPic−1, inclusive.

Otherwise (rect_slice_flag is equal to 1), the following applies:
  The slice address is the slice index of the slice within the SubPicIdx-th subpicture.
  The length of slice_address is Ceil(Log 2(NumSlicesInSubpic[SubPicIdx])) bits.
  The value of slice_address shall be in the range of 0 to NumSlicesInSubpic[SubPicIdx]−1, inclusive.

In some embodiments, for bitstream conformance, the following constraints apply:
  If rect_slice_flag is equal to 0 or subpics_present_flag is equal to 0, the value of slice_address shall not be equal to the value of slice_address of any other coded slice NAL unit of the same coded picture.
  Otherwise, the pair of slice_subpic_id and slice_address values shall not be equal to the pair of slice_subpic_id and slice_address values of any other coded slice NAL unit of the same coded picture.
  When rect_slice_flag is equal to 0, the slices of a picture shall be in increasing order of their slice_address values.
  The shapes of the slices of a picture shall be such that each CTU, when decoded, shall have its entire left boundary and entire top boundary consisting of a picture boundary or consisting of boundaries of previously decoded CTU(s).

The value of the syntax element num_tiles_in_slice_minus1 plus 1, when present, specifies the number of tiles in the slice. The value of num_tiles_in_slice_minus1 shall be in the range of 0 to NumTilesInPic−1, inclusive.

The variable NumCtuInCurrSlice, which specifies the number of CTUs in the current slice, and the list CtbAddrInCurrSlice[i], for i ranging from 0 to NumCtuInCurrSlice−1, inclusive, specifying the picture raster scan address of the i-th CTB within the slice, are derived as follows:

```
if (slices_in_pic_present_flag)
    NumCtuInCurrSlice = num_ctus_in_slice_minus1 + 1
else if( rect_slice_flag ) {
        picLevelSliceIdx = SliceSubpicToPicIdx[ SubPicIdx ][ slice_address ]
        NumCtuInCurrSlice = NumCtuInSlice[ picLevelSliceIdx ]
        for( i = 0; i < NumCtuInCurrSlice; i++ )
            CtbAddrInCurrSlice[ i ] = CtbAddrInSlice[ picLevelSliceIdx ][ i ]
} else {
        NumCtuInCurrSlice = 0
        for( tileIdx = slice_address; tileIdx <=
slice_address + num_tiles_in_slice_minus1[ i ]; tileIdx++ ) {
            tileX = tileIdx % NumTileColumns
            tileY = tileIdx / NumTileColumns
            for( ctbY = tileRowBd[ tileY ]; ctbY < tileRowBd[ tileY + 1 ]; ctbY++ )
{
                for( ctbX = tileColBd[ tileX ]; ctbX < tileColBd[ tileX + 1 ];
ctbX++ ) {
                    CtbAddrInCurrSlice[ NumCtuInCurrSlice ] =
ctbY * PicWidthInCtb + ctbX
                    NumCtuInCurrSlice++
                }
            }
        }
}
```

In some embodiments, the slice-in-tile case for the raster scan slice is allowed, and the slice may or may not be rectangular. In some embodiments, a syntax element no_pic_partition_flag being equal to 0 specifies that each picture referring to the PPS may be partitioned into more than one tile or slice. In some embodiments, for raster scan slice-in-tile cases, each slice is specified in units of CTUs in raster scan within a tile.

Figure 3:
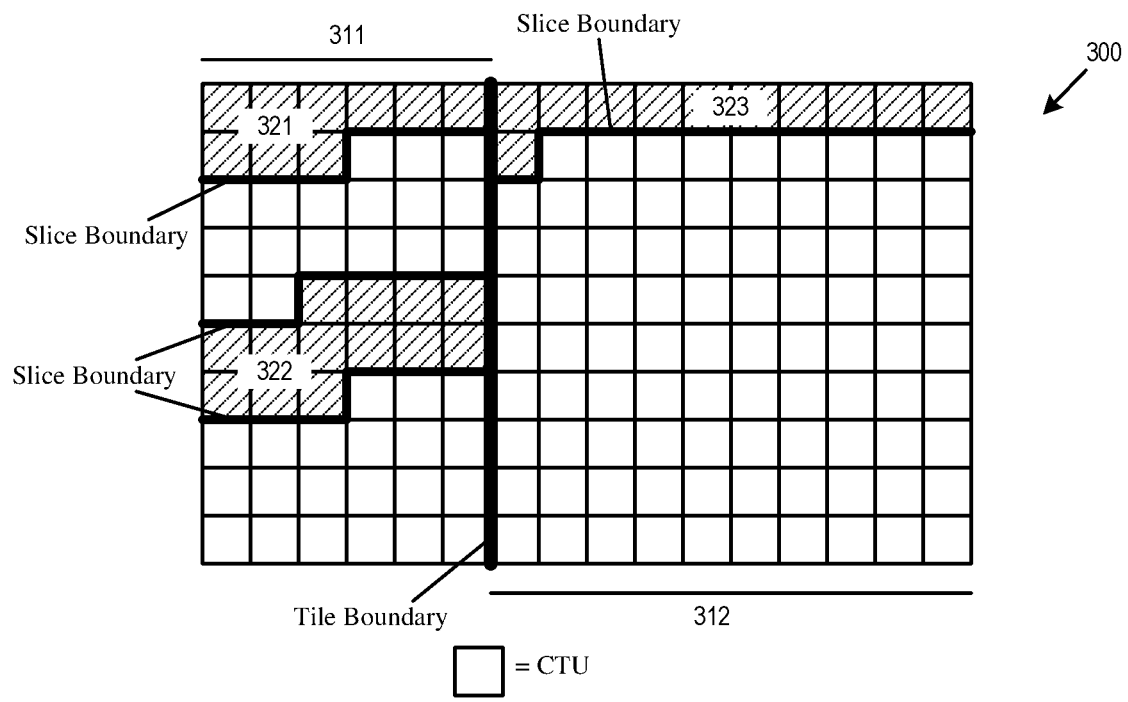
FIG. 3 illustrates slices in a video picture having slices in tiles in raster scan.

FIG. 3 illustrates slices in a video picture 300 having slices in tiles in raster scan (or raster scan slice-in-tile case.) The video picture 300 has two tiles 311 and 312 that are separated by a tile boundary. Each tile includes slices in raster scan that are limited by tile boundaries, such as non-rectangular slices 321 and 322 in tile 311, and non-rectangular slice 323 in tile 312. In some embodiments, when the current picture is partitioned into non-rectangular slices (or raster scan slices), whether multiple slices are coded in a tile is specified in the bitstream. When multiple slices are coded in a tile, the number of CTUs in a slice is specified in the bitstream. Table 11 show slice header syntax for the raster scan slice-in-tile case.

TABLE 11

| | Descriptor |
|---|---|
| slice_header( ) { | |
|   slice_pic_order_cnt_lsb | u(v) |
|   if( subpics_present_flag ) | |
|     slice_subpic_id | u(v) |
|   if( rect_slice_flag \|\| NumTilesInPic > 1 ) | |
|     slice_address | u(v) |
|   if( !rect_slice_flag && NumTilesInPic > 1 ) { | |
|     num_tiles_in_slice_minus1 | ue(v) |
|     if( !num_tiles_in_slice_minus1 ) | |
|       slices_in_tile_present_flag | u(1) |
|     if( slices_in_tile_present_flag ) | |
|       num_ctus_in_slice_minus1 | ue(v) |
| } | |
|   slice_type | ue(v) |
|   ... | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

The value of the syntax element slices_in_tile_present_flag being equal to 1 specifies that the multiple slices are present in the tile. The value of slices_in_tile_present_flag being equal to 0 specifies that no multiple slices is present in the current tile. When not present, slices_in_tile_present_flag is inferred to be equal to 0.

The value of the syntax element num_ctus_in_slice_minus1 plus 1 specifies the number of CTUs in the current slice. When the value of slices_in_tile_present_flag is equal to 1, the value of num_ctus_in_slice_minus1 shall be in the range of 0 to TileSizeInCtbsY−1, inclusive, where TileSizeInCtbsY=RowHeight[tileY] *RowWidth[tileX], tileX is the tile column index containing the current slice, and tileY is the tile row index containing the current slice. When not present, num_ctus_in_slice_minus1 is inferred to be equal to PicSizeInCtbsY−1.

The value of the syntax element slice_address specifies the slice address of the slice. When not present, the value of slice_address is inferred to be equal to 0.

If slices_in_tile_present_flag is equal to 1, the following applies:
  The slice address is the first CTB in the slice, in CTB raster scan of a picture.
  The length of slice_address is Ceil(Log 2 (TileSizeInCtbsY)) bits.
  The value of slice_address shall be in the range of 0 to TileSizeInCtbsY−1, inclusive, and the value of slice_address shall not be equal to the value of slice_address of any other coded slice NAL unit of the same coded picture.

Otherwise, if rect_slice_flag is equal to 0, the following applies:
  The slice address is the raster scan tile index.
  The length of slice_address is Ceil(Log 2 (NumTilesInPic)) bits.
  The value of slice_address shall be in the range of 0 to NumTilesInPic−1, inclusive.

Otherwise (rect_slice_flag is equal to 1), the following applies:
  The slice address is the slice index of the slice within the SubPicIdx-th subpicture.
  The length of slice_address is Ceil(Log 2(NumSlicesInSubpic[SubPicIdx])) bits.

The value of slice_address shall be in the range of 0 to NumSlicesInSubpic[SubPicIdx]−1, inclusive.

In some embodiments, for bitstream conformance, the following constraints apply:

- If rect_slice_flag is equal to 0 or subpics_present_flag is equal to 0, the value of slice_address shall not be equal to the value of slice_address of any other coded slice NAL unit of the same coded picture.
- Otherwise, the pair of slice_subpic_id and slice_address values shall not be equal to the pair of slice_subpic_id and slice_address values of any other coded slice NAL unit of the same coded picture.
- When rect_slice_flag is equal to 0, the slices of a picture shall be in increasing order of their slice_address values.
- The shapes of the slices of a picture shall be such that each CTU, when decoded, shall have its entire left boundary and entire top boundary consisting of a picture boundary or consisting of boundaries of previously decoded CTU(s).

The value of the syntax element num_tiles_in_slice_minus1 plus 1, when present, specifies the number of tiles in the slice. The value of num_tiles_in_slice_minus1 shall be in the range of 0 to NumTilesInPic−1, inclusive.

The variable NumCtuInCurrSlice, which specifies the number of CTUs in the current slice, and the list CtbAddrInCurrSlice[i], for i ranging from 0 to NumCtuInCurrSlice−1, inclusive, specifying the picture raster scan address of the i-th CTB within the slice, are derived as follows:

```
if( rect_slice_flag ) {
    picLevelSliceIdx =
SliceSubpicToPicIdx[ SubPicIdx ][ slice_address ]
    NumCtuInCurrSlice = NumCtuInSlice[ picLevelSliceIdx ]
    for( i = 0; i < NumCtuInCurrSlice; i++ )
        CtbAddrInCurrSlice[ i ] =
CtbAddrInSlice[ picLevelSliceIdx ][ i ]
} else if( slices_in_tile_present_flag )
    NumCtuInCurrSlice = num_ctus_in_slice_minus1 + 1
} else {
    NumCtuInCurrSlice = 0
    for( tileIdx = slice_address; tileIdx <=
slice_address + num_tiles_in_slice_minus1[ i ]; tileIdx++ ) {
        tileX = tileIdx % NumTileColumns
        tileY = tileIdx / NumTileColumns
        for( ctbY = tileRowBd[ tileY ]; ctbY < tileRowBd[ tileY + 1 ];
ctbY++ ) {
            for( ctbX = tileColBd[ tileX ]; ctbX <
tileColBd[ tileX + 1 ]; ctbX++ ) {
                CtbAddrInCurrSlice[ NumCtuInCurrSlice ] =
ctbY * PicWidthInCtb + ctbX
                NumCtuInCurrSlice++
            }
        }
    }
}
```

IV. Subpicture-Based Slices

In some embodiments, raster scan slices in units of CTU may be based on subpictures. Table 12 illustrates a PPS that includes syntax elements related to subpicture-based slices. Table 13 illustrates a slice header that includes syntax elements related to subpicture-based slices.

TABLE 12

Subpicture-based Slices in PPS

| | Descriptor |
|---|---|
| pic_parameter_set_rbsp( ) { | |
|   pps_pic_parameter_set_id | ue(v) |
|   ... | |
|   output_flag_present_flag | u(1) |
|   mixed_nalu_types_in_pic_flag | u(1) |
|   pps_subpic_id_signalling_present_flag | u(1) |
|   if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       tile_idx_delta_present_flag | u(1) |
|       for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] == 0 && | |
|           slice_height_in_tiles_minus1[ i ] == 0 ) { | |
|           num_slices_in_tile_minus1[ i ] | ue(v) |
|           numSlicesInTileMinus1 = num_slices_in_tile_minus1[ i ] | |
|           for( j = 0; j < numSlicesInTileMinus1; j++ ) | |
|             slice_height_in_ctu_minus1 [ i++ ] | ue(v) |
|         } | |

TABLE 12-continued

Subpicture-based Slices in PPS

| | Descriptor |
|---|---|
|       if( tile_idx_delta_present_flag && i < num_slices_in_pic_minus1 ) | |
|         tile_idx_delta[ i ] | se(v) |
|       } | |
|     } | |
|     loop_filter_across_tiles_enabled_flag | u(1) |
|     loop_filter_across_slices_enabled_flag | u(1) |
|   } | |
|   else | |
|     raster_scan_slice_in_pic_enabled_flag | u(1) |
|     if( raster_scan_slice_in_pic_enabled_flag ) | |
|       loop_filter_across_slices_enabled_flag | u(1) |
|     entropy_coding_sync_enabled_flag | u(1) |
|   ... | |
|   picture_header_extension_present_flag | u(1) |
|   slice_header_extension_present_flag | u(1) |
|   pps_extension_flag | u(1) |
|   if( pps_extension_flag ) | |
|     while( more_rbsp_data( ) ) | |
|       pps_extension_data_flag | u(1) |
|   rbsp_trailing_bits( ) | |
| } | |

TABLE 13

Slice header with syntax elements related to subpicture-based slices

| | Descriptor |
|---|---|
| slice_header( ) { | |
|   slice_pic_order_cnt_lsb | u(v) |
|   if( subpics_present_flag ) | |
|     slice_subpic_id | u(v) |
|   if( raster_scan_slice_in_pic_enabled_flag \|\| !rect_slice_flag && NumTilesInPic = 1 ) | |
|     slices_in_pic_present_flag | u(1) |
|   if( slices_in_pic_present_flag ) { | |
|     slice_address | u(v) |
|     num_ctus_in_slice_minus1 | ue(v) |
|   } | |
|   else if( rect_slice_flag \|\| NumTilesInPic > 1 ) | |
|     slice_address | u(v) |
|   if( !rect_slice_flag && NumTilesInPic > 1 ) | |
|     num_tiles_in_slice_minus1 | ue(v) |
|   slice_type | ue(v) |
|   ... | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

The syntax element subpics_present_flag being equal to 1 specifies that one or more subpictures are present in each coded picture in the CLVS and subpicture parameters are present in in the SPS RBSP syntax. The syntax element subpics_present_flag being equal to 0 specifies that no subpictures are present in each coded picture in the CLVS and subpicture parameters are not present in the SPS RBSP syntax. In some embodiments, when a bitstream is the result of a sub-bitstream extraction process and contains only a subset of the subpictures of the input bitstream to the sub-bitstream extraction process, the value of subpics_present_flag is set equal to 1 in the RBSP of the SPSs. When subpics_present_flag is equal to 0, each coded picture in the CLVS may be considered as a subpicture in a bitstream extraction and merging process.

The syntax element sps_num_subpics_minus1 plus 1 specifies the number of subpictures. The value of sps_num_subpics_minus1 is constrained to be in the range of 0 to 254. When not present, the value of sps_num_subpics_minus1 is inferred to be equal to 0. The value of sps_num_subpics_minus1 being equal to 0 indicates that the each coded picture in the CLVS is the subpicture.

The syntax element rect_slice_flag being equal to 0 specifies that tiles or CTUs within each slice are in raster scan order and the slice information is not signaled in PPS. The value of rect_slice_flag being equal to 1 specifies that tiles or CTUs within each slice cover a rectangular region of the picture and the slice information is signalled in the PPS. When not present, rect_slice_flag is inferred to be equal to 1. When subpics_present_flag is equal to 1, the value of rect_slice_flag shall be equal to 1. When raster_scan_slice_in_pic_enabled_flag is equal to 1, the value of rect_slice_flag is inferred to be equal to 0.

The syntax element no_pic_partition_flag being equal to 1 specifies that no picture tile partitioning is applied to the picture(s) that refer to the PPS. The value of no_pic_partition_flag being equal to 0 specifies that the picture(s) referring to the PPS may be partitioned into more than one tile or slice.

The syntax element raster_scan_slice_in_pic_enabled_flag being equal to 0 specifies that no raster scan slice partitioning is applied to the picture(s) that refer to the PPS. raster_scan_slice_in_pic_enabled_flag equal to 1 specifies that, when no_pic_partition_flag is equal to 1, each picture referring to the PPS may be partitioned into more then one raster scan slice, and when subpics_present_flag is equal to 1, one or more subpictures in each picture referring to the PPS may be partitioned into more than one raster scan slice. When not present, the value of raster_scan_slice_in_pic_enabled_flag is inferred to be equal to 0.

The syntax element single_slice_per_subpic_flag being equal to 1 specifies that each subpicture consists of one and only one rectangular slice. The value of single_slice_per_subpic_flag being equal to 0 specifies that each subpicture may consist one or more rectangular slices. When single_slice_per_subpic_flag is equal to 1, num_slices_in_pic_minus1 is inferred to be equal to sps_num_subpics_minus1. When single_slice_per_subpic_flag is equal to 1 and sps_num_subpics_minus1 is equal to 0, num_slices_in_pic_minus1 is inferred to be equal to 0 (i.e. the current picture is the subpicture and consists only one rectangular slice).

The syntax element slices_in_pic_present_flag being equal to 1 specifies that multiple slices are present in the current picture. The value of slices_in_pic_present_flag equal to 0 specifies no multiple slices is present in the current picture. When not present, the value of slices_in_pic_present_flag is inferred to be equal to 0.

The syntax element num_ctus_in_slice_minus1 plus 1 specifies the number of CTUs in the current slice. When slices_in_pic_present_flag is equal to 1, the value of num_ctus_in_slice_minus1 shall be in the range of 0 to PicSizeInCtbsY−1, inclusive. When not present, the value of num_ctus_in_slice_minus1 is inferred to be equal to PicSizeInCtbsY−1.

The syntax element slice_address specifies the slice address of the slice. When not present, the value of slice_address is inferred to be equal to 0. In some embodiments, If slices_in_pic_present_flag is equal to 1, and subpics_present_flag is equal to 1, the following applies:
  The slice address is the first CTB in the slice, in CTB raster scan of a subpicture.
  The length of slice_address is Ceil(Log 2 (PicSizeInCtbsY)) bits.
  The value of slice_address shall be in the range of 0 to PicSizeInCtbsY−1, inclusive, and the value of slice_address shall not be equal to the value of slice_address of any other coded slice NAL unit of the same coded subpicture.

Otherwise, if slices_in_pic_present_flag is equal to 1, and subpics_present_flag is equal to 0, the following applies:
  The slice address is the first CTB in the slice, in CTB raster scan of a picture.
  The length of slice_address is Ceil(Log 2 (PicSizeInCtbsY)) bits.
  The value of slice_address shall be in the range of 0 to PicSizeInCtbsY−1, inclusive, and the value of slice_address shall not be equal to the value of slice_address of any other coded slice NAL unit of the same coded picture.

Otherwise, if rect_slice_flag is equal to 0, the following applies:
  The slice address is the raster scan tile index.
  The length of slice_address is Ceil(Log 2 (NumTilesInPic)) bits.
  The value of slice_address shall be in the range of 0 to NumTilesInPic−1, inclusive Otherwise (rect_slice_flag is equal to 1), the following applies:
  The slice address is the slice index of the slice within the SubPicIdx-th subpicture.
  The length of slice_address is Ceil(Log 2(NumSlicesInSubpic[SubPicIdx])) bits.
  The value of slice_address shall be in the range of 0 to NumSlicesInSubpic[SubPicIdx]−1, inclusive It is a requirement of bitstream conformance that the following constraints apply:
  If rect_slice_flag is equal to 0 or subpics_present_flag is equal to 0, the value of slice_address shall not be equal to the value of slice_address of any other coded slice NAL unit of the same coded picture.
  Otherwise, the pair of slice_subpic_id and slice_address values shall not be equal to the pair of slice_subpic_id and slice_address values of any other coded slice NAL unit of the same coded picture.
  When rect_slice_flag is equal to 0, the slices of a picture shall be in increasing order of their slice_address values.
  The shapes of the slices of a picture shall be such that each CTU, when decoded, shall have its entire left boundary and entire top boundary consisting of a picture boundary or consisting of boundaries of previously decoded CTU(s).

The syntax element num_tiles_in_slice_minus1 plus 1, when present, specifies the number of tiles in the slice. The value of num_tiles_in_slice_minus1 shall be in the range of 0 to NumTilesInPic−1, inclusive.

The variable NumCtuInCurrSlice, which specifies the number of CTUs in the current slice, and the list CtbAddrInCurrSlice[i], for i ranging from 0 to NumCtuInCurrSlice−1, inclusive, specifying the picture raster scan address of the i-th CTB within the slice, are derived as follows:

```
if (slices_in_pic_present_flag)
    NumCtuInCurrSlice = num_ctus_in_slice_minus1 + 1
else if( rect_slice_flag ) {
    picLevelSliceIdx = SliceSubpicToPicIdx[ SubPicIdx ][ slice_address ]
    NumCtuInCurrSlice = NumCtuInSlice[ picLevelSliceIdx ]
    for( i = 0; i < NumCtuInCurrSlice; i++ )
        CtbAddrInCurrSlice[ i ] = CtbAddrInSlice[ picLevelSliceIdx ][ i ] }
else {
```

```
        NumCtuInCurrSlice = 0
        for( tileIdx = slice_address; tileIdx <=
slice_address + num_tiles_in_slice_minus1[ i ]; tileIdx++ ) {
                tileX = tileIdx % NumTileColumns
                tileY = tileIdx / NumTileColumns
                for( ctbY = tileRowBd[ tileY ]; ctbY < tileRowBd[ tileY + 1 ]; ctbY++ )
{
                        for( ctbX = tileColBd[ tileX ]; ctbX < tileColBd[ tileX + 1 ];
ctbX++ ) {
                                CtbAddrInCurrSlice[ NumCtuInCurrSlice ] =
ctbY * PicWidthInCtb + ctbX
                                NumCtuInCurrSlice++
                        }
                }
        }
}
```

The foregoing proposed method can be implemented in encoders and/or decoders. For example, the proposed method can be implemented in a header parsing module of an encoder, and/or a header parsing module of a decoder. Video encoders have to follow the foregoing syntax design so as to generate the legal bitstream, and video decoders are able to decode the bitstream correctly only if the parsing process is complied with the foregoing syntax design. When the syntax is skipped in the bitstream, encoders and decoders should set the syntax value as the inferred value to guarantee the encoding and decoding results are matched.

V. Example Video Encoder

Figure 4:
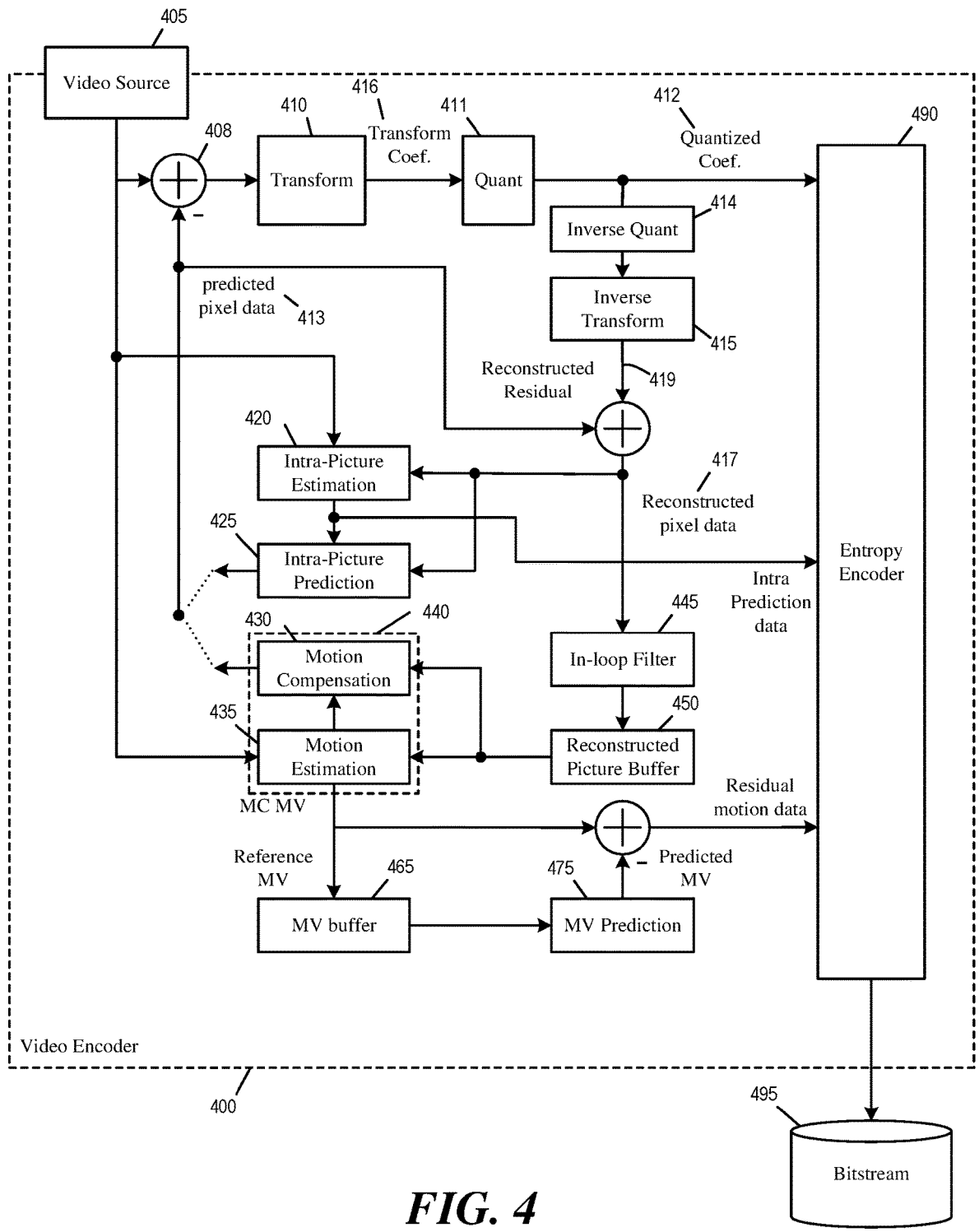
FIG. 4 illustrates an example video encoder.

FIG. 4 illustrates an example video encoder 400. As illustrated, the video encoder 400 receives input video signal from a video source 405 and encodes the signal into bitstream 495. The video encoder 400 has several components or modules for encoding the signal from the video source 405, at least including some components selected from a transform module 410, a quantization module 411, an inverse quantization module 414, an inverse transform module 415, an intra-picture estimation module 420, an intra-prediction module 425, a motion compensation module 430, a motion estimation module 435, an in-loop filter 445, a reconstructed picture buffer 450, a MV buffer 465, and a MV prediction module 475, and an entropy encoder 490. The motion compensation module 430 and the motion estimation module 435 are part of an inter-prediction module 440.

In some embodiments, the modules 410-490 are modules of software instructions being executed by one or more processing units (e.g., a processor) of a computing device or electronic apparatus. In some embodiments, the modules 410-490 are modules of hardware circuits implemented by one or more integrated circuits (ICs) of an electronic apparatus. Though the modules 410-490 are illustrated as being separate modules, some of the modules can be combined into a single module.

The video source 405 provides a raw video signal that presents pixel data of each video frame without compression. A subtractor 408 computes the difference between the raw video pixel data of the video source 405 and the predicted pixel data 413 from the motion compensation module 430 or intra-prediction module 425. The transform module 410 converts the difference (or the residual pixel data or residual signal 409) into transform coefficients (e.g., by performing Discrete Cosine Transform, or DCT). The quantization module 411 quantizes the transform coefficients into quantized data (or quantized coefficients) 412, which is encoded into the bitstream 495 by the entropy encoder 490.

The inverse quantization module 414 de-quantizes the quantized data (or quantized coefficients) 412 to obtain transform coefficients, and the inverse transform module 415 performs inverse transform on the transform coefficients to produce reconstructed residual 419. The reconstructed residual 419 is added with the predicted pixel data 413 to produce reconstructed pixel data 417. In some embodiments, the reconstructed pixel data 417 is temporarily stored in a line buffer (not illustrated) for intra-picture prediction and spatial MV prediction. The reconstructed pixels are filtered by the in-loop filter 445 and stored in the reconstructed picture buffer 450. In some embodiments, the reconstructed picture buffer 450 is a storage external to the video encoder 400. In some embodiments, the reconstructed picture buffer 450 is a storage internal to the video encoder 400.

The intra-picture estimation module 420 performs intra-prediction based on the reconstructed pixel data 417 to produce intra prediction data. The intra-prediction data is provided to the entropy encoder 490 to be encoded into bitstream 495. The intra-prediction data is also used by the intra-prediction module 425 to produce the predicted pixel data 413.

The motion estimation module 435 performs inter-prediction by producing MVs to reference pixel data of previously decoded frames stored in the reconstructed picture buffer 450. These MVs are provided to the motion compensation module 430 to produce predicted pixel data.

Instead of encoding the complete actual MVs in the bitstream, the video encoder 400 uses MV prediction to generate predicted MVs, and the difference between the MVs used for motion compensation and the predicted MVs is encoded as residual motion data and stored in the bitstream 495.

The MV prediction module 475 generates the predicted MVs based on reference MVs that were generated for encoding previously video frames, i.e., the motion compensation MVs that were used to perform motion compensation. The MV prediction module 475 retrieves reference MVs from previous video frames from the MV buffer 465. The video encoder 400 stores the MVs generated for the current video frame in the MV buffer 465 as reference MVs for generating predicted MVs.

The MV prediction module 475 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 495 by the entropy encoder 490.

The entropy encoder 490 encodes various parameters and data into the bitstream 495 by using entropy-coding techniques such as context-adaptive binary arithmetic coding (CABAC) or Huffman encoding. The entropy encoder 490 encodes various header elements, flags, along with the quantized transform coefficients 412, and the residual motion data as syntax elements into the bitstream 495. The bitstream 495 is in turn stored in a storage device or transmitted to a decoder over a communications medium such as a network.

The in-loop filter 445 performs filtering or smoothing operations on the reconstructed pixel data 417 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 5:
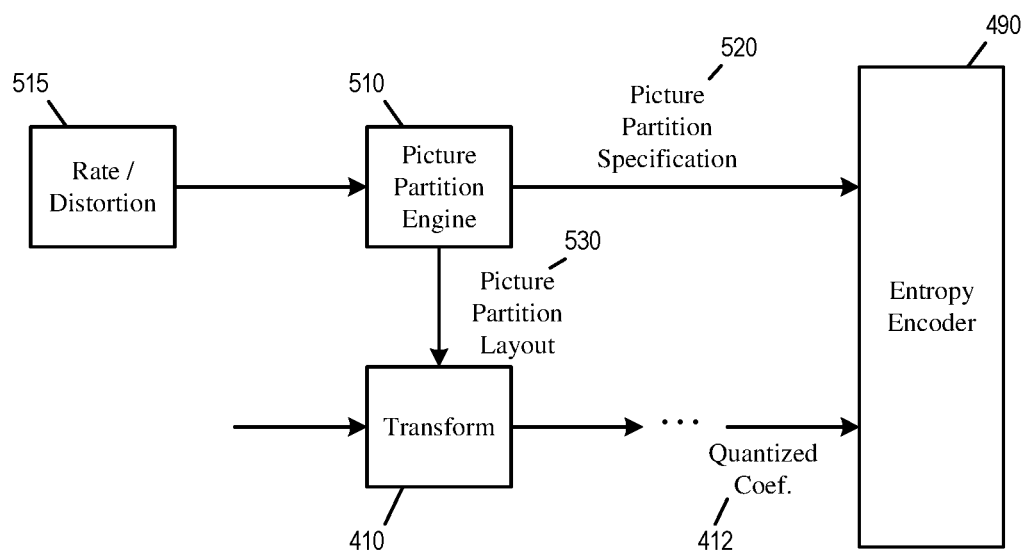
FIG. 5 illustrates portions of the video encoder that implements specification of subpicture layout, slice structure, and picture identification.

FIG. 5 illustrates portions of the video encoder 400 that implements specification of subpicture layout, slice structure, and picture identification. Specifically, a picture partition engine 510 generates a set of picture partitioning specifications 520 for the entropy encoder 490 based on a set of hardware and rate/distortion information 515. These picture partitioning specifications 520 include slice layout information, subpicture layout information, and slice layout information. The picture partition engine may infer the sizes and the positions of some of the subpictures by referencing widths and positions of other subpictures as described in Section II and FIG. 1 above.

The entropy encoder 490 correspondingly signals flags or parameters such as positions and sizes of subpictures (with positions and sizes of some subpicture(s) inferred and not signaled), slice-in-tile or slice-in-picture indications, raster scan slice or rectangular slice indications in SPSs, PPSs, or slice headers of the bitstream 495. The entropy encoder 490 may further signal picture order counts and picture header repeat indications in picture headers in the bitstream 495. The picture partition engine 510 also provide corresponding picture partitioning layout 530 to the transform module 410, intra-picture estimation module 420, Intra-picture prediction module 425, inter-prediction module 440, etc., so these modules may encode the current picture according to the subpicture, tile, and slice layout.

Figure 6:
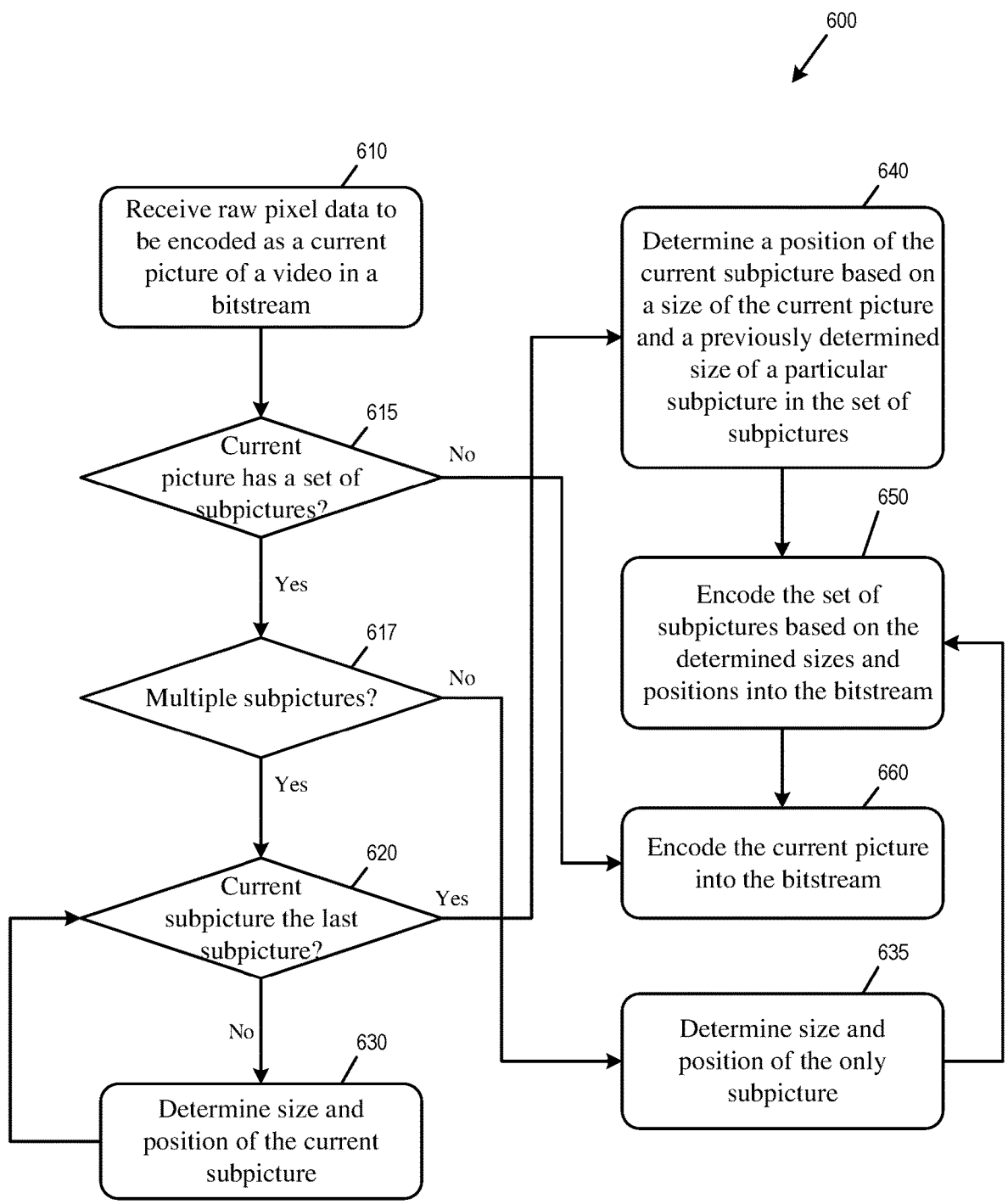
FIG. 6 conceptually illustrates a process for determining sizes and positions of subpictures in a picture.

FIG. 6 conceptually illustrates a process 600 for determining sizes (widths and/or heights) and positions of subpictures in a picture. In some embodiments, one or more processing units (e.g., a processor) of a computing device implements the encoder 400 performs the process 600 by executing instructions stored in a computer readable medium. In some embodiments, an electronic apparatus implementing the encoder 400 performs the process 600.

The encoder receives (at block 610) raw pixel data to be encoded as a current picture of a video. The encoder determines (at block 615) whether the current picture is associated with a set of subpictures. If so, the process proceeds to block 617. If the current picture is not associated with any subpicture, the process proceeds to block 660.

At block 617, the encoder determines whether there are multiple subpictures associated with the current picture. If so, the process proceeds to 620. If there is only one subpicture associated with the current picture, the encoder determines (at block 635) the size (width and/or height) and position of the only subpicture and proceeds to 650.

At block 620, the encoder determines whether the current subpicture is the last subpicture in the set of subpictures, i.e., when the current subpicture is processed after all other subpictures in the set of subpictures. In some embodiments, the subpictures in the set of subpictures are indexed and the current subpicture is the last indexed subpicture in the set indexed subpictures. If the current subpicture is the last picture, the process proceeds to 640. If the current subpicture is not the last subpicture in the set of subpictures, the process proceeds to block 630.

At block 630, the encoder determines the size (width and/or height) and position of the current subpicture. The encoder may receive a specification of the size (width and/or height) of the current subpicture from the encoding configuration. The process then returns to block 620 to process a next subpicture as the current subpicture.

At 640, the encoder determines a position of the current subpicture (the last subpicture) based on a size (width and/or height) of the current picture and a previously determined size (width and/or height) of a particular subpicture in the set of subpictures. The size of the current subpicture is inferred and not signaled in the bitstream. For example, the encoder may determine the horizontal or x-position of the current subpicture based on the width of the current picture and a previously determined width of the particular subpicture. The encoder may also determine the vertical or y-position of the current subpicture based on the height of the current picture and a previously determined height of the particular subpicture. The process then proceeds to block 650.

The position of the current subpicture may be determined based on the width and/or the height of the current subpicture. The width of the current subpicture may be determined based on the width of the particular subpictures in the set of subpictures and a width of the current picture. The height of the current subpicture may be determined based on the height of the particular subpictures in the set of subpictures and a height of the current picture. In some embodiments, the width of the current subpicture may be determined by subtracting from the width of the current picture, widths of all subpictures in the row of the set of subpictures except the current subpicture; and the height of the current subpicture may be determined by subtracting from the height of the current picture, heights of all subpictures in the column of the set of subpictures except the current subpicture. In some embodiments, the determined position of the subpicture is expressed as an index of a coded tree block (CTB) at a corner of the current subpicture, and the width and/or height of the particular picture are expressed in terms of a number of coded tree bocks (CTBs).

The encoder encodes (at block 650) the set of subpictures based on the determined positions and sizes of the subpictures into the bitstream. The encoder also encodes (at block 660) the current picture into the bitstream.

VI. Example Video Decoder

Figure 7:
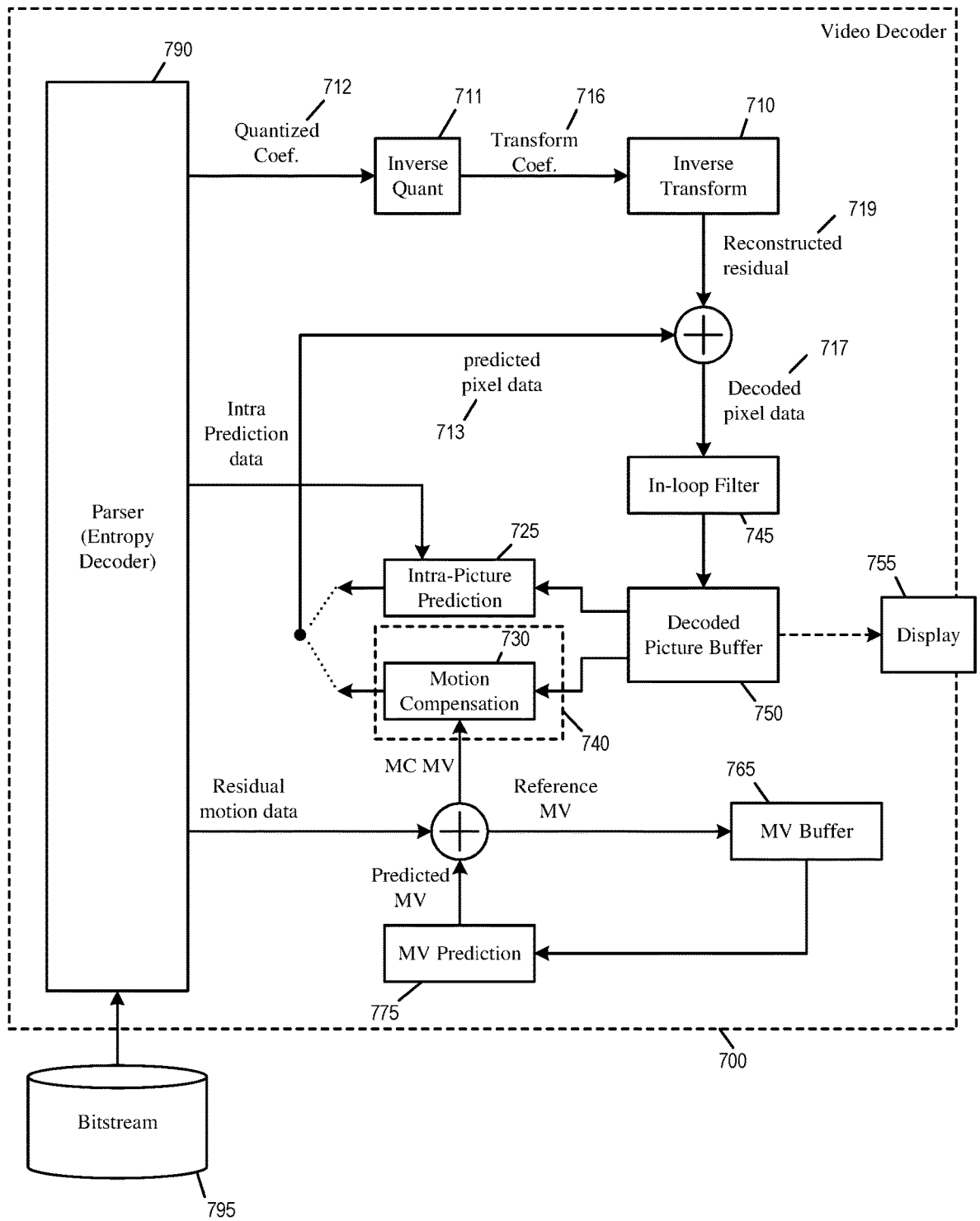
FIG. 7 illustrates an example video decoder.

FIG. 7 illustrates an example video decoder 700. As illustrated, the video decoder 700 is an image-decoding or video-decoding circuit that receives a bitstream 795 and decodes the content of the bitstream into pixel data of video frames for display. The video decoder 700 has several components or modules for decoding the bitstream 795, including some components selected from an inverse quantization module 711, an inverse transform module 710, an intra-prediction module 725, a motion compensation module 730, an in-loop filter 745, a decoded picture buffer 750, a MV buffer 765, a MV prediction module 775, and a parser 790. The motion compensation module 730 is part of an inter-prediction module 740.

In some embodiments, the modules 710-790 are modules of software instructions being executed by one or more processing units (e.g., a processor) of a computing device. In some embodiments, the modules 710-790 are modules of hardware circuits implemented by one or more ICs of an electronic apparatus. Though the modules 710-790 are illustrated as being separate modules, some of the modules can be combined into a single module.

The parser 790 (or entropy decoder) receives the bitstream 795 and performs initial parsing according to the syntax defined by a video-coding or image-coding standard. The parsed syntax element includes various header elements, flags, as well as quantized data (or quantized coefficients) 712. The parser 790 parses out the various syntax elements by using entropy-coding techniques such as context-adaptive binary arithmetic coding (CABAC) or Huffman encoding.

The inverse quantization module 711 de-quantizes the quantized data (or quantized coefficients) 712 to obtain transform coefficients, and the inverse transform module 710 performs inverse transform on the transform coefficients 716 to produce reconstructed residual signal 719. The reconstructed residual signal 719 is added with predicted pixel data 713 from the intra-prediction module 725 or the motion compensation module 730 to produce decoded pixel data 717. The decoded pixels data are filtered by the in-loop filter 745 and stored in the decoded picture buffer 750. In some embodiments, the decoded picture buffer 750 is a storage external to the video decoder 700. In some embodiments, the decoded picture buffer 750 is a storage internal to the video decoder 700.

The intra-prediction module 725 receives intra-prediction data from bitstream 795 and according to which, produces the predicted pixel data 713 from the decoded pixel data 717 stored in the decoded picture buffer 750. In some embodiments, the decoded pixel data 717 is also stored in a line buffer (not illustrated) for intra-picture prediction and spatial MV prediction.

In some embodiments, the content of the decoded picture buffer 750 is used for display. A display device 755 either retrieves the content of the decoded picture buffer 750 for display directly, or retrieves the content of the decoded picture buffer to a display buffer. In some embodiments, the display device receives pixel values from the decoded picture buffer 750 through a pixel transport.

The motion compensation module 730 produces predicted pixel data 713 from the decoded pixel data 717 stored in the decoded picture buffer 750 according to motion compensation MVs (MC MVs). These motion compensation MVs are decoded by adding the residual motion data received from the bitstream 795 with predicted MVs received from the MV prediction module 775.

The MV prediction module 775 generates the predicted MVs based on reference MVs that were generated for decoding previous video frames, e.g., the motion compensation MVs that were used to perform motion compensation. The MV prediction module 775 retrieves the reference MVs of previous video frames from the MV buffer 765. The video decoder 700 stores the motion compensation MVs generated for decoding the current video frame in the MV buffer 765 as reference MVs for producing predicted MVs.

The in-loop filter 745 performs filtering or smoothing operations on the decoded pixel data 717 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 8:
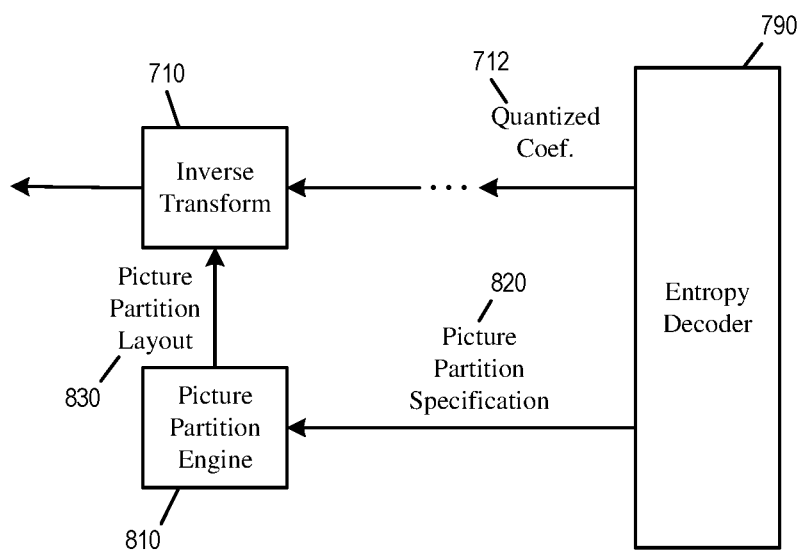
FIG. 8 illustrates portions of the video decoder that receives and applies specifications of subpicture layout, slice structure, and picture identification.

FIG. 8 illustrates portions of the video decoder 700 that receives and applies specifications of subpicture layout, slice structure, and picture identification. Specifically, the entropy decoder 790 parses the bitstream 795 for syntax elements related to picture partitioning, including flags or parameters such as positions and sizes of subpictures (with positions and sizes of some subpicture(s) inferred and not signaled), slice-in-tile or slice-in-picture indications, raster scan slice or rectangular slice indications in SPSs, PPSs, or slice headers of the bitstream 795. The entropy decoder 790 also parses picture order counts and picture header repeat indications in picture headers. Based on the parsed syntax elements, the entropy decoder 790 generates a set of picture partitioning information 820 for a picture partition engine 810. The picture partition engine 810 provides corresponding picture partitioning layout 830 to the inverse transform module 710, Intra-picture prediction module 725, inter-prediction module 740, etc., so these modules may reconstruct the current picture according to the subpicture, tile, and slice layout. The picture partition engine may also infer the sizes and the positions of some of the subpictures by referencing widths and positions of other subpictures as described in Section II and FIG. 1 above.

Figure 9:
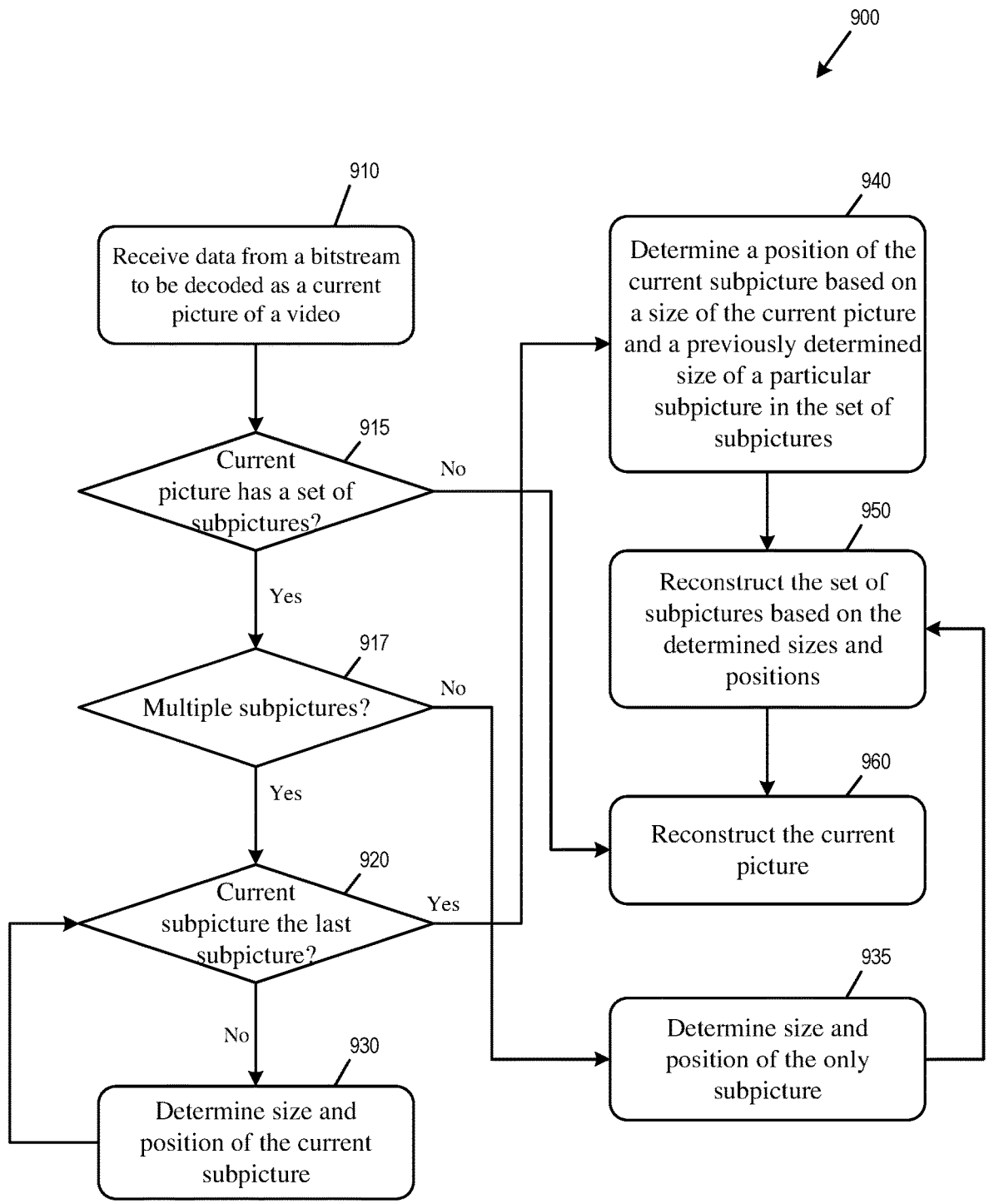
FIG. 9 conceptually illustrates a process for determining sizes and positions of subpictures in a picture.

FIG. 9 conceptually illustrates a process 900 for determining sizes (width and/or height) and positions of subpictures in a picture. In some embodiments, one or more processing units (e.g., a processor) of a computing device implements the decoder 700 performs the process 900 by executing instructions stored in a computer readable medium. In some embodiments, an electronic apparatus implementing the decoder 700 performs the process 900.

The decoder receives (at block 910) data from a bitstream to be decoded as a current picture of a video. The decoder determines (at block 915) whether the current picture is associated with a set of subpictures. If so, the process proceeds to block 917. If the current picture is not associated with any subpicture, the process proceeds to block 960.

At block 917, the decoder determines whether there are multiple subpictures associated with the current picture. If so, the process proceeds to 920. If the there is only one subpicture associated with the current picture, the decoder determines (at block 935) the size (width and/or height) and position of the only subpicture and proceeds to 950.

At block 920, the decoder determines whether the current subpicture is the last subpicture in the set of subpictures, i.e., when the current subpicture is processed after all other subpictures in the set of subpictures. In some embodiments, the subpictures in the set of subpictures are indexed and the current subpicture is the last indexed subpicture in the set indexed subpictures. If the current subpicture is the last subpicture, the process proceeds to 940. If the current subpicture is not the last subpicture in the set of subpictures, the process proceeds to block 930.

At block 930, the decoder determines the size (width and/or height) and position of the current subpicture. The decoder may receive a specification of the size (width and/or height) of the current subpicture from the bitstream. The process then returns to block 920 to process a next subpicture as the current subpicture.

At 940, the decoder determines a position of the current subpicture (the last subpicture) based on a size (width and/or height) of the current picture and a previously determined size (width and/or height) of a particular subpicture in the set of subpictures. The size of the current subpicture is inferred and not parsed from the bitstream. For example, the decoder may determine the horizontal or x-position of the current subpicture based on the width of the current picture and a previously determined width of the particular subpictures. The decoder may also determine the vertical or y-position of the current subpicture based on the height of the current picture and a previously determined height of the particular subpictures. The process then proceeds to block 950.

The position of the current subpicture may be determined based on the width and/or the height of the current subpicture. The width of the current subpicture may be determined based on the width of the particular subpictures in the set of subpictures and a width of the current picture. The height of the current subpicture may be determined based on the height of the particular subpictures in the set of subpictures. In some embodiments, the width of the current subpicture may be determined by subtracting from the width of the current picture, widths of all subpictures in the row of the set of subpictures except the current subpicture; and the height of the current subpicture may be determined by subtracting from the height of the current picture, heights of all subpictures in the column of the set of subpictures except the current subpicture. In some embodiments, the determined position of the subpicture is expressed as an index of a coded tree block (CTB) at a corner of the current subpicture, and the width and/or the height of the particular picture are expressed in terms of a number of coded tree bocks (CTBs).

The decoder reconstructs (at block 950) the set of subpictures based on the determined positions and sizes of the subpictures. The decoder also reconstructs (at block 960) the current picture.

In some embodiments, an encoder may signal (or generate) one or more syntax element in a bitstream, such that a decoder may parse said one or more syntax element from the bitstream.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 10:
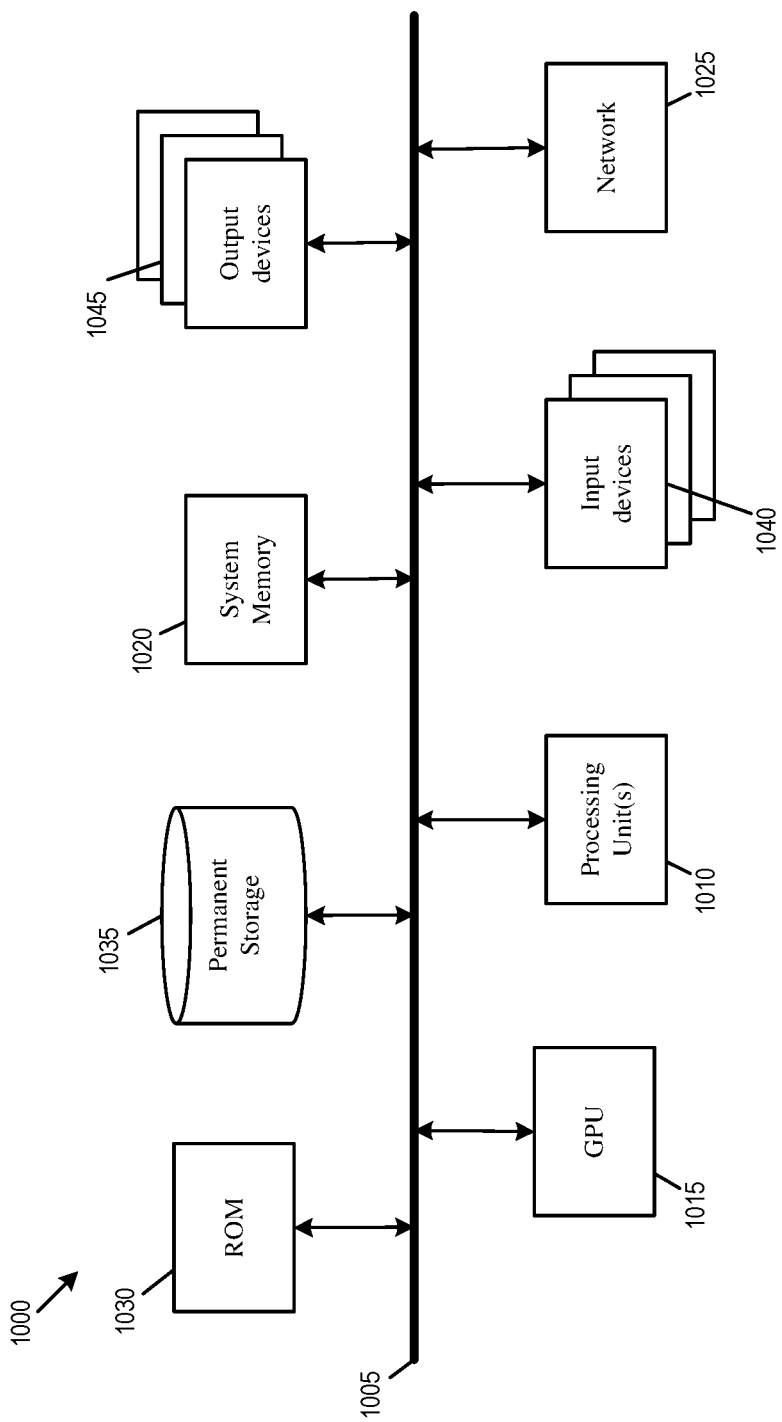
FIG. 10 conceptually illustrates an electronic system with which some embodiments of the present disclosure are implemented.

FIG. 10 conceptually illustrates an electronic system 1000 with which some embodiments of the present disclosure are implemented. The electronic system 1000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1000 includes a bus 1005, processing unit(s) 1010, a graphics-processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the GPU 1015, the read-only memory 1030, the system memory 1020, and the permanent storage device 1035.

From these various memory units, the processing unit(s) 1010 retrieves instructions to execute and data to process in order to execute the processes of the present disclosure. The processing unit(s) may be a single processor or a multi-core processor in different embodiments. Some instructions are passed to and executed by the GPU 1015. The GPU 1015 can offload various computations or complement the image processing provided by the processing unit(s) 1010.

The read-only-memory (ROM) 1030 stores static data and instructions that are used by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the present disclosure use a mass-storage device (such as a magnetic or optical disk and its corresponding disk drive) as the permanent storage device 1035.

Other embodiments use a removable storage device (such as a floppy disk, flash memory device, etc., and its corresponding disk drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor uses at runtime. In some embodiments, processes in accordance with the present disclosure are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alpha-numeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 6 and FIG. 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
   receiving data from a bitstream to be decoded as a current picture of a video, wherein a picture order count of the current picture is received from a picture header of the current picture, the picture header being a raw byte sequence payload (RBSP) syntax element indicating a start of the current picture in the bitstream;
   determining positions and sizes of subpictures in a set of subpictures of the current picture, including:
   determining a width and a height of a first subpicture of the set of subpictures as specified in a sequence parameter set that is provided in the bitstream and applicable to the current picture;
   setting a position of the first subpicture of the set of subpictures as [0, 0] that is relative to the current picture, the position of the first subpicture corresponding to a top-left position of the first subpicture, a parameter specifying the position of the first subpicture being omitted in the sequence parameter set; and
   deriving a width and a height of a last subpicture of the set of subpictures based on a width and a height of the current picture and sizes of one or more subpictures in the set of subpictures other than the last subpicture, the width and the height of the last subpicture of the set of subpictures being omitted in the sequence parameter set; and
   reconstructing the current picture based on the subpictures in the set of subpictures of the current picture and the determined positions of the subpictures, wherein
   the width of the last subpicture is determined by subtracting one or more widths of one or more last row subpictures in the set of subpictures except the last subpicture from the width of the current picture, and
   the height of the last subpicture is determined by subtracting one or more heights of one or more last column subpictures in the set of subpictures except the last subpicture from the height of the current picture, wherein:
   the picture order count is signaled in the picture header when the picture header is repeated in the bitstream.

2. The video decoding method of claim 1, wherein a determined position of a current subpicture is expressed as an index of a coded tree block (CTB) at a corner of the current subpicture.

3. The video decoding method of claim 1, wherein the width and the height of the current picture are expressed in terms of a number of coded tree bocks (CTBs).

4. The video decoding method of claim 1, wherein the subpictures in the set of subpictures are indexed.

5. The video decoding method of claim 1, wherein the width and the height of the last sub picture are determined based on the sizes of the one or more subpictures in the set of subpictures and the width and the height of the current picture.

6. The video decoding method of claim 1, wherein a width and a height of the last sub picture are inferred and are omitted in the sequence parameter set.

7. The video decoding method of claim 1, wherein a slice address is signaled in the bitstream for a non-rectangular or raster scan slice in the current picture, wherein the slice address is an index associated with a first coded tree block (CTB) in the slice.

8. The video decoding method of claim 1, wherein the picture order count of the current picture is signaled in one or more slice headers of the current picture.

9. The video decoding method of claim 1, wherein the picture header has a flag for indicating whether the picture header is repeated, wherein the sequence parameter set applicable to the current picture includes a flag for indicating whether picture header repetition is allowed.

10. A video encoding method, comprising:
    receiving raw pixel data to be encoded as a current picture of a video into a bitstream,
    wherein a picture order count of the current picture is received from a picture header of the current picture, the picture header being a raw byte sequence payload (RBSP) syntax element indicating a start of the current picture in the bitstream;
    determining positions and sizes of subpictures in a set of subpictures of the current picture, including:
    determining a width and a height of a first subpicture of the set of subpictures to be specified in a sequence parameter set that is included in the bitstream and applicable to the current picture;
    setting a position of the first subpicture of the set of subpictures as [0,0] that is relative to the current picture, the position of the first subpicture corresponding to a top-left position of the first subpicture; and
    determining a width and a height of a last subpicture of the set of subpictures based on a width and a height of the current picture and sizes of one or more subpictures in the set of subpictures other than the last subpicture, the width and the height of the last subpicture of the set of subpictures being omitted in the sequence parameter set; and
    encoding the current picture based on the subpictures in the set of sub pictures of the current picture and the determined positions of the sub pictures, wherein the width of the last sub picture is determined by subtracting one or more widths of one or more last row subpictures in the set of subpictures except the last subpicture from the width of the current picture, and
    the height of the last subpicture is determined by subtracting one or more heights of one or more last column subpictures in the set of subpictures except the last subpicture from the height of the current picture, wherein:

the picture order count is signaled in the picture header when the picture header is repeated in the bitstream.

11. An electronic apparatus, comprising:
a video decoder circuit configured to:
receive data from a bitstream to be decoded as a current picture of a video,
wherein a picture order count of the current picture is received from a picture header of the current picture, the picture header being a raw byte sequence payload (RBSP) syntax element indicating a start of the current picture in the bitstream;
determine positions and sizes of subpictures in a set of subpictures of the current picture, by at least:
determining a width and a height of a first subpicture of the set of subpictures as specified in a sequence parameter set that is provided in the bitstream and applicable to the current picture;
setting a position of the first subpicture of the set of sub pictures as [0, 0] that is relative to the current picture, the position of the first subpicture corresponding to a top-left position of the first subpicture, a parameter specifying the position of the first subpicture being omitted in the sequence parameter set; and
deriving a width and a height of a last subpicture of the set of sub pictures based on a width and a height of the current picture and sizes of one or more subpictures in the set of subpictures other than the last subpicture, the width and the height of the last subpicture of the set of subpictures being omitted in the sequence parameter set: and
reconstruct the current picture based on the subpictures in the set of subpictures of the current picture and the determined positions of the subpictures, wherein
the width of the last subpicture is determined by subtracting one or more widths of one or more last row subpictures in the set of subpictures except the last subpicture from the width of the current picture, and
the height of the last subpicture is determined by subtracting one or more heights of one or more last column subpictures in the set of subpictures except the last subpicture from the height of the current picture, wherein:
the picture header has a flag for indicating whether the picture header is repeated, wherein the sequence parameter set applicable to the current picture includes a flag for indicating whether picture header repetition is allowed.

* * * * *